US011533305B2

(12) United States Patent
Tomita

(10) Patent No.: US 11,533,305 B2
(45) Date of Patent: Dec. 20, 2022

(54) AUTHENTICATION SYSTEM, ASSISTANCE SERVER AND NON-TRANSITORY COMPUTER-READABLE RECORDING MEDIUM ENCODED WITH ASSISTANCE PROGRAM

(71) Applicant: Konica Minolta, Inc., Tokyo (JP)

(72) Inventor: Atsushi Tomita, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 246 days.

(21) Appl. No.: 16/935,284

(22) Filed: Jul. 22, 2020

(65) Prior Publication Data
US 2021/0029113 A1 Jan. 28, 2021

(30) Foreign Application Priority Data
Jul. 24, 2019 (JP) ............................. JP2019-136380

(51) Int. Cl.
*H04L 29/06* (2006.01)
*H04L 9/40* (2022.01)
*H04L 67/306* (2022.01)

(52) U.S. Cl.
CPC ........ *H04L 63/0861* (2013.01); *H04L 67/306* (2013.01)

(58) Field of Classification Search
None
See application file for complete search history.

(56) References Cited

U.S. PATENT DOCUMENTS

| 7,171,198 B2* | 1/2007 | Paila | H04W 12/069 |
| | | | 455/435.2 |
| 2004/0088260 A1* | 5/2004 | Foster | G06Q 20/382 |
| | | | 705/64 |
| 2006/0071066 A1* | 4/2006 | Vanzini | G06F 21/34 |
| | | | 235/382 |

(Continued)

FOREIGN PATENT DOCUMENTS

| JP | 2008181491 A | 8/2008 |
| JP | 4294069 B2 | 7/2009 |
| JP | 2014026560 A | 2/2014 |

OTHER PUBLICATIONS

Spotify (Spotify found accounts.com/en/login, Jun. 2, 2019). (Year: 2019).*

*Primary Examiner* — Piotr Poltorak
(74) *Attorney, Agent, or Firm* — Buchanan Ingersoll & Rooney PC

(57) ABSTRACT

Authentication system includes an information processing apparatus, an authentication server and an assistance server, wherein the authentication server, in response to being requested to perform authentication of the user, performs authentication of the user using first authentication data that associates user identification information for identifying a registered user with first authentication information, and the assistance server, in response to detection of no registration of second authentication information that is different from the first authentication information of the user, acquires the first authentication data from the authentication server, and produces second authentication data that associates the second authentication information with the first authentication data.

18 Claims, 26 Drawing Sheets

(56) References Cited

U.S. PATENT DOCUMENTS

| | | | |
|---|---|---|---|
| 2008/0178265 A1* | 7/2008 | Tsuchiya | G06Q 20/40 |
| | | | 726/3 |
| 2008/0184352 A1* | 7/2008 | Nishiguchi | G06F 21/32 |
| | | | 726/7 |
| 2009/0025072 A1* | 1/2009 | Kondo | G06F 21/608 |
| | | | 726/7 |
| 2011/0197271 A1* | 8/2011 | Buck | H04L 9/3215 |
| | | | 726/9 |
| 2014/0033287 A1* | 1/2014 | Kawai | H04L 63/083 |
| | | | 726/7 |
| 2020/0053095 A1* | 2/2020 | Friant | H04L 63/102 |

* cited by examiner

FIG. 2

| ID | PASSWORD |

FIG. 3

| ID | PASSWORD | FINGERPRINT |

F I G. 1 2
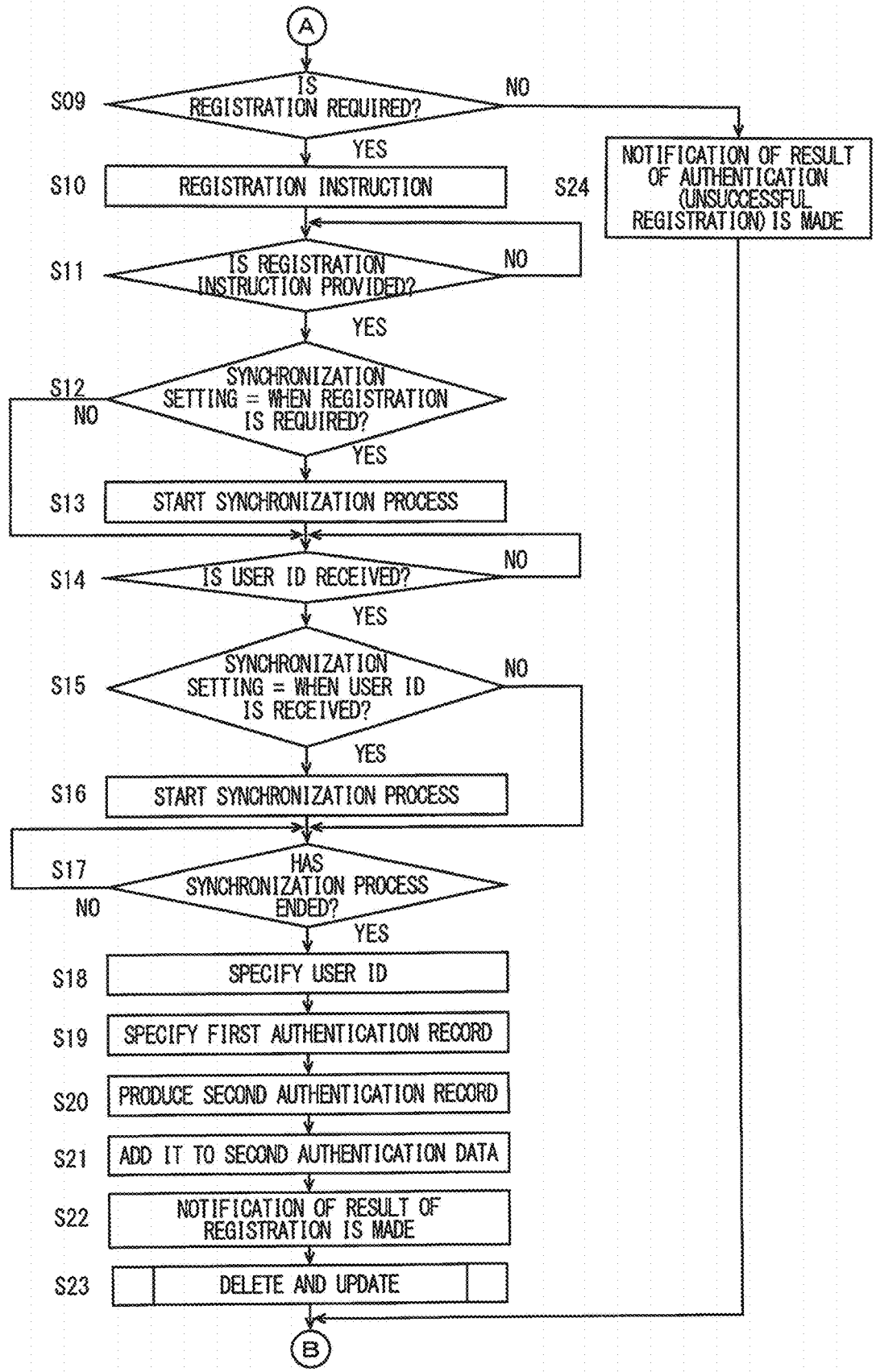

F I G. 1 5
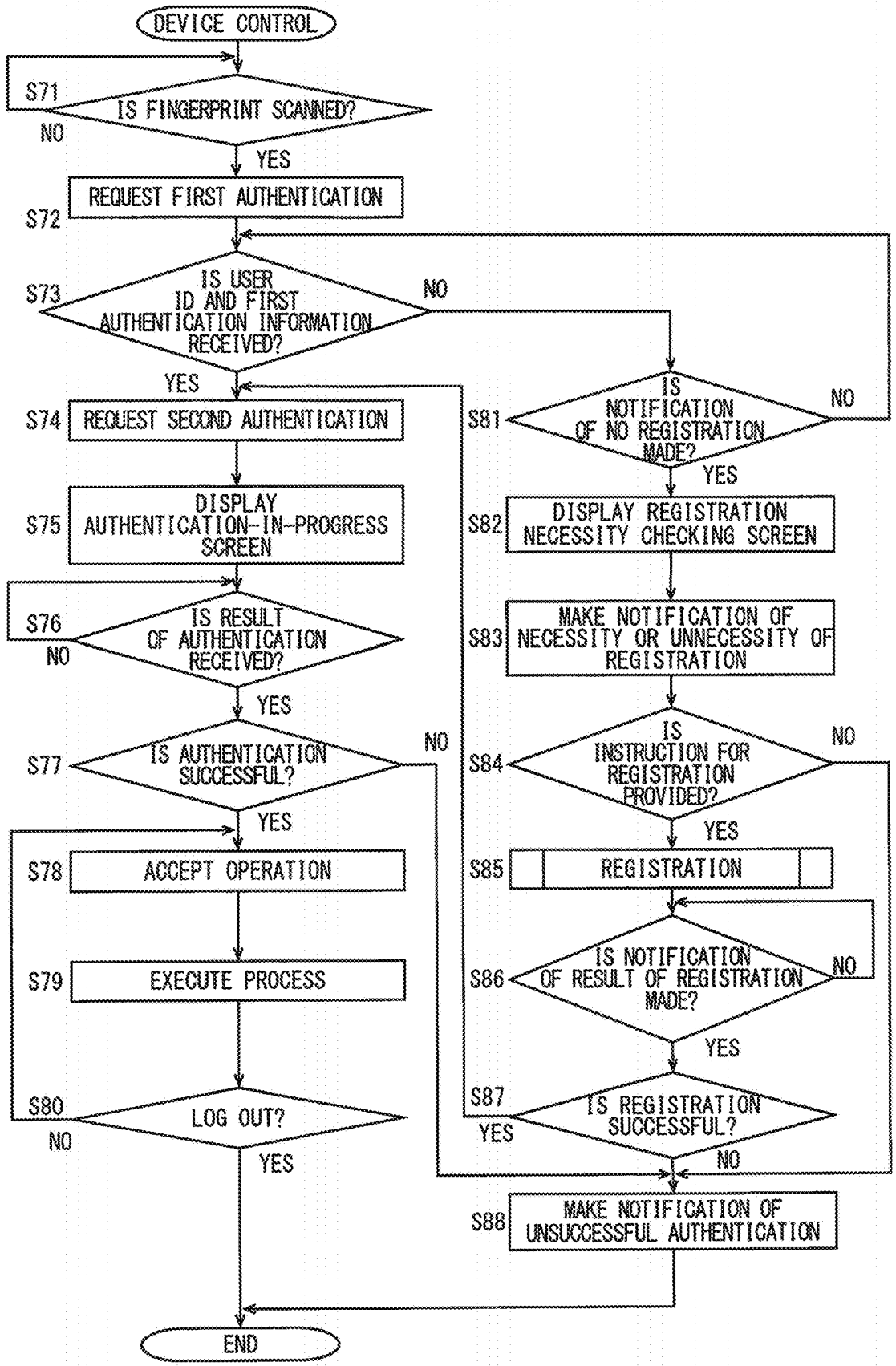

FIG. 19

PLEASE PLACE YOUR FINGER ON A FINGER SCANNING DEVICE.

F I G. 2 7
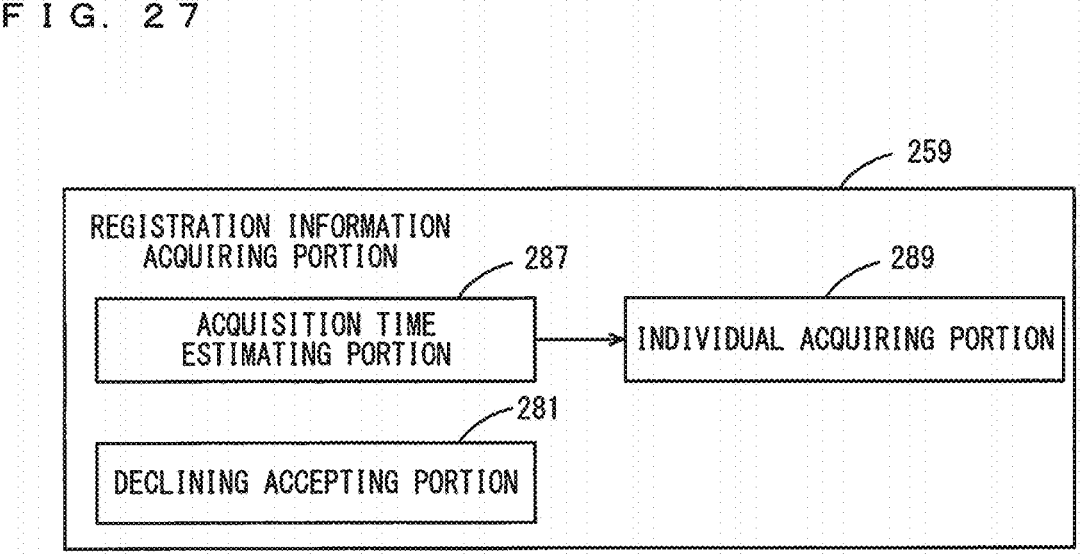

ard ID that has failed authentication and register them in the case where the result of authentication indicates unsuccessful authentication and the MFP is inquired by the IC card authentication server whether the card ID is to be registered.

AUTHENTICATION SYSTEM, ASSISTANCE SERVER AND NON-TRANSITORY COMPUTER-READABLE RECORDING MEDIUM ENCODED WITH ASSISTANCE PROGRAM

The entire disclosure of Japanese patent Application No. 2019-136380 filed on Jul. 24, 2019, is incorporated herein by reference in its entirety.

BACKGROUND

Technological Field

The present invention relates to an authentication system, an assistance server and a non-transitory computer-readable recording medium encoded with an assistance program. In particular, the present invention relates to an authentication system including an information processing apparatus, an authentication server that performs authentication of a user who operates the information processing apparatus, an assistance server and a non-transitory computer-readable recording medium encoded with an assistance program that is executed by a computer that controls the assistance server.

Description of the Related Art

Conventionally, an authentication system that performs authentication of a user who operates an information processing apparatus using an authentication server has been known. In this authentication system, the user is registered in the authentication server. For example, Japanese Patent Laid-Open No. 2008-181491 describes an information processing system that is characterized in that an MFP is configured to transmit a card ID read from an IC card to an IC card authentication server to acquire a result of authentication, permit the use of the MFP in the case where the result of authentication indicates successful authentication, and transmit a user name input by an operation unit to the IC card authentication server, link the user name with the card ID that has failed authentication and register them in the case where the result of authentication indicates unsuccessful authentication and the MFP is inquired by the IC card authentication server whether the card ID is to be registered.

Meanwhile, authentication using another authentication information may be desired with the existing authentication system implemented. For example, a method of using a biometric feature for authentication such as a user's fingerprint may be used instead of the method of using a card ID for authentication. In this case, the existing authentication system must be replaced with another authentication system. In the case where another system is utilizing the result of authentication provided by the existing authentication system, etc., a change may be required for the other system. Therefore, there is a problem that the cost for replacing the authentication system is high.

SUMMARY

According to one aspect of the present invention, an authentication system includes an information processing apparatus, an authentication server and an assistance server, wherein the authentication server, in response to being requested to perform authentication of the user, performs authentication of the user using first authentication data that associates user identification information for identifying a registered user with first authentication information, and the assistance server, in response to detection of no registration of second authentication information that is different from the first authentication information of the user, acquires the first authentication data from the authentication server, and produces second authentication data that associates the second authentication information with the first authentication data.

According to another aspect of the present invention, an assistance server assists authentication by an authentication server of a user who operates an information processing apparatus, wherein the authentication server, in response to being requested to perform authentication of the user, performs authentication of the user using first authentication data that associates user identification information for identifying a registered user with first authentication information, and the assistance server includes a hardware processor, and the hardware processor is configured to, in response to detection of no registration of second authentication information that is different from the first authentication information of the user, acquire the first authentication data from the authentication server, and produce second authentication data that associates the second authentication information with the first authentication data.

According to yet another aspect of the present invention, a non-transitory computer-readable recording medium is encoded with an assistance program executed by a computer controlling an assistance server that assists authentication by an authentication server of a user who operates an information processing apparatus, wherein the authentication server performs authentication of the user using first authentication data that associates user identification information for identifying a registered user with first authentication information, and the assistance program causes the computer to, in response to detection of no registration of second authentication information that is different from the first authentication information of the user, acquire the first authentication data from the authentication server, and produce second authentication data that associates the second authentication information with the first authentication data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 2 is a diagram showing one example of the format of a first authentication record;

FIG. 3 is a diagram showing one example of the format of a second authentication record;

FIG. 12 is a second flowchart showing the one example of the flow of the assistance process;

FIG. 15 is a flowchart showing one example of a flow of a device control process;

FIG. 19 is a diagram showing one example of a biometric information scan screen;

FIG. 27 is a block diagram showing one example of the detailed functions of a registration information acquiring portion in a third modified example;

DETAILED DESCRIPTION OF EMBODIMENTS

Figure 1:
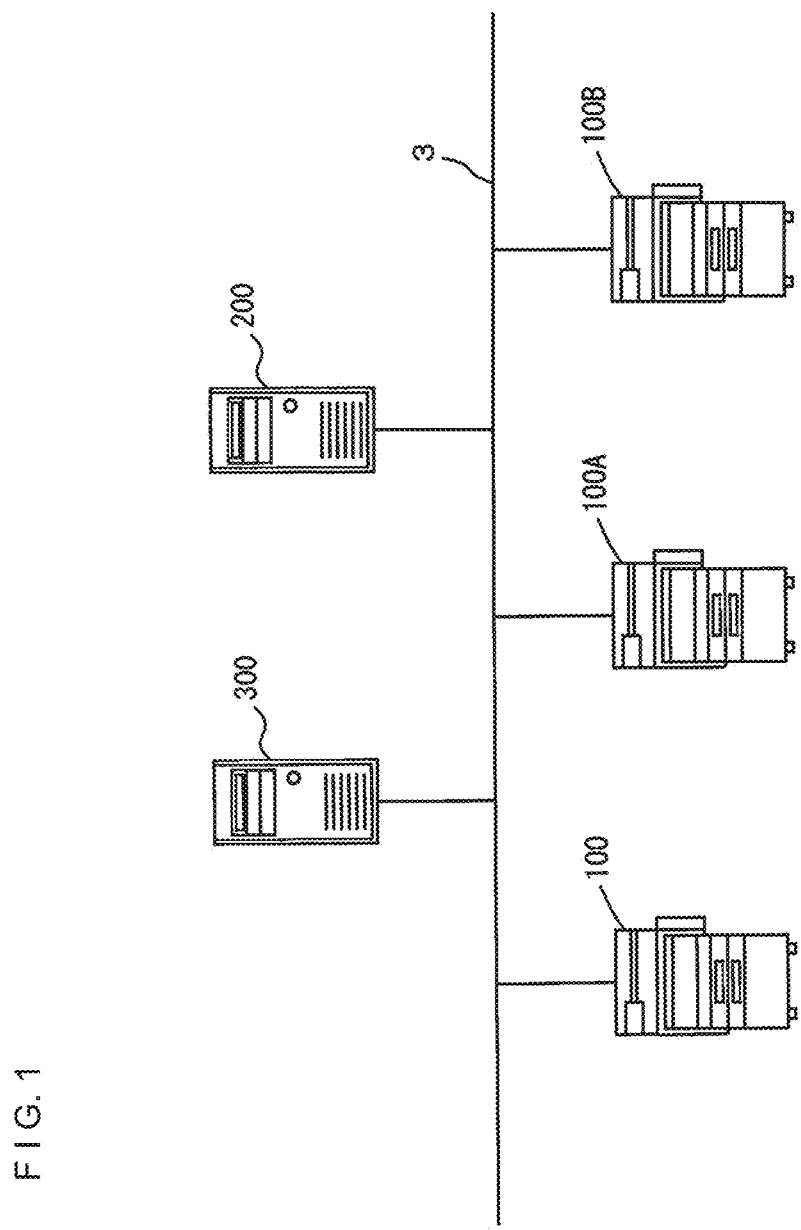
FIG. 1 is a diagram showing one example of an overview of an authentication system in one embodiment of the present invention.

Hereinafter, one or more embodiments of the present invention will be described with reference to the drawings. However, the scope of the invention is not limited to the disclosed embodiments.

In the following description, the same parts are denoted with the same reference characters. Their names and functions are also the same. Therefore, a detailed description thereof will not be repeated.

FIG. 1 is a diagram showing one example of an overview of an authentication system in one of the embodiments of the present invention. Referring to FIG. 1, the authentication system 1 includes MFPs (Multi Function Peripherals) 100, 100A, 100B, an assistance server 200 and an authentication server 300. The MFPs 100, 100A, 100B, the assistance server 200 and the authentication server 300 are respectively connected to a network 3. Thus, the MFPs 100, 100A, 100B, the assistance server 200 and the authentication server 300 can communicate with one another.

The network 3 is a Local Area Network (LAN). Further, the network 3 is not limited to a LAN and may be a WAN (Wide Area Network) or the Internet.

While the assistance server 200 and the authentication server 300 are constituted by separate hardware in the present embodiment, the assistance server 200 and the authentication server 300 may be constituted by the same hardware.

In the authentication system 1 in the present embodiment, the authentication server 300 functions as an LDAP (Lightweight Directory Access Protocol) server, for example. For example, the authentication server 300 is an AD (Active Directory) service server. Specifically, the authentication server 300 stores hardware information in regard to hardware resources such as the assistance server 200 and the MFPs 100, 100A, 100B that are present on the network 3, and user information such as attributes and access rights of users who use the hardware resources. The authentication server 300 unitarily manages the hardware resources and the users using the hardware information and the user information.

The authentication server 300 performs authentication of the users who operate the MFPs 100, 100A, 100B in order to restrict the users who operate the MFPs 100, 100A, 100B. First authentication information is used as the information unique to the users for authentication performed by the authentication server 300. In the present embodiment, the first authentication information is a password. The password is an array of any number of alphanumeric characters or characters. Thus, the authentication server 300 stores first authentication data defining the first authentication information for each user. The first authentication data is the data that associates the user with the first authentication information. In the present embodiment, the first authentication data includes a first authentication record for each of one or more users.

While being a password by way of example in the present embodiment, the first authentication information may be a card number stored in an IC card or device identification information for identifying a portable information device such as a smartphone, for example, as long as being the information to be used by the authentication server 300 for authentication.

FIG. 2 is a diagram showing one example of the format of the first authentication record. Referring to FIG. 2, the first authentication record includes an item for a user ID and an item for a password. In the item for a user ID, the user identification information for identifying a user such as a user name is set. In the item for a password, a password that is the first authentication information is set.

In the authentication system 1 in the present embodiment, the assistance server 200 is added to the system constituted by the MFPs 100, 100A, 100B and the authentication server 300. The assistance server 200 has the function of specifying the user who operates the MFP 100 and the function of notifying the MFP 100 of the first authentication information required for authentication in the authentication server 300, for example.

As the information for specifying the user who operates the MFP 100 in the assistance server 200, second authentication information that is unique to the user and different from the first authentication information is stored in the assistance server 200. The second authentication information is biometric information representing a biometric feature of the user. Biometric features of the user are a fingerprint, a vein, an iris, a retina, a shape of palm, a facial feature, a physique and a voiceprint, for example. In the present embodiment, a fingerprint is described as the biometric feature by way of example. The second authentication information stored in the assistance server 200 is the biometric information that is produced based on a plurality of images acquired when a user's fingerprint is scanned multiple times. The assistance server 200 stores second authentication data defining the second authentication information for each user. The second authentication data is the data that associates the user, the first authentication information and the second authentication information with one another. In the present embodiment, the second authentication data includes a second authentication record for each of one or more users.

Because the authentication system 1 to which the assistance server 200 is added specifies a user using the second authentication information and specifies the first authentication information corresponding to the user, the authentication system 1 can notify the MFP 100 of the first authentication information. Further, the assistance server 200 is added, whereby it is possible to use the information input by a user when the user operates any one of the MFPs 100, 100A, 100B as the second authentication information instead of the first authentication information without changing the function of the authentication server 300 in the authentication system 1. Further, because not being changed, the authentication server 300 can function as an LDAP server. For example, it is not necessary to change an application program installed in the authentication server 300. This application program is a program that defines a process using information in regard to a user who is authenticated by the authentication server 300, for example. Specifically, the application program is a program that defines a process of managing the usage history of the MFPs 100, 100A, 100B for each user, for example.

The assistance server 200 may execute a process of producing the biometric information. In this case, the image obtained by scanning of a fingerprint by the MFP 100 is transmitted to the assistance server 200.

FIG. 3 is a diagram showing one example of the format of the second authentication record. Referring to FIG. 3, the second authentication record includes an item for a user ID, an item for a password and an item for a fingerprint. In the item for a user ID, user identification information for identifying a user is set. In the item for a password, a password that is the first authentication information is set. In the item for a fingerprint, the biometric information that is the second authentication information is set.

Figure 4:
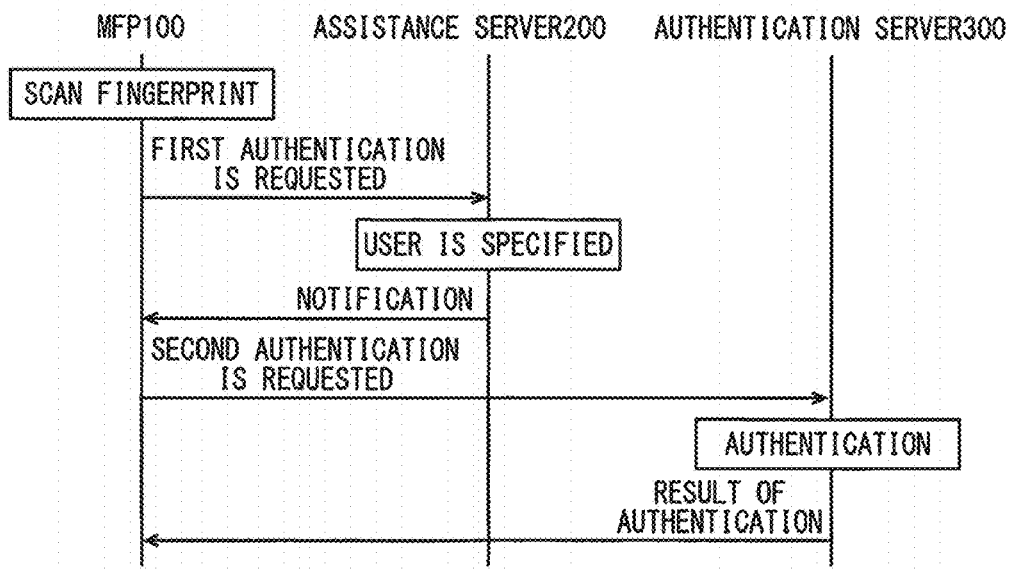
FIG. 4 is a diagram for explaining a process of performing authentication of a user in an authentication system.

FIG. 4 is a diagram for explaining a process of performing authentication of a user in the authentication system. Referring to FIG. 4, the process to be executed respectively in the MFP 100, the assistance server 200 and authentication server 300 is shown. Because the process to be executed respectively in the MFPs 100, 100A, 100B is the same, the MFP 100 is shown here as an example. First, the user causes the MFP 100 to scan his or her fingerprint. The MFP 100 produces biometric information from an image obtained by scanning of the fingerprint and requests the assistance server 200 to perform authentication. Hereinafter, a request for authentication made by the MFP 100 to the assistance server 200 is referred to as a first authentication request.

When authentication is requested by the MFP 100, the assistance server 200 specifies the second authentication record that includes the second authentication information similar to the biometric information produced in the MFP 100 with reference to the second authentication data to specify the user. Then, the assistance server 200 notifies the MFP 100 of the user ID and the password of the specified user. In response to being notified by the assistance server 200, the MFP 100 requests the authentication server 300 to perform authentication using the user ID and the password. Hereinafter, a request for authentication sent from the MFP 100 to the authentication server 300 is referred to as a second authentication request.

When authentication is requested by the MFP 100, the authentication server 300 performs authentication with reference to the first authentication data. Then, the authentication server 300 transmits a result of authentication to the MFP 100.

Figure 5:
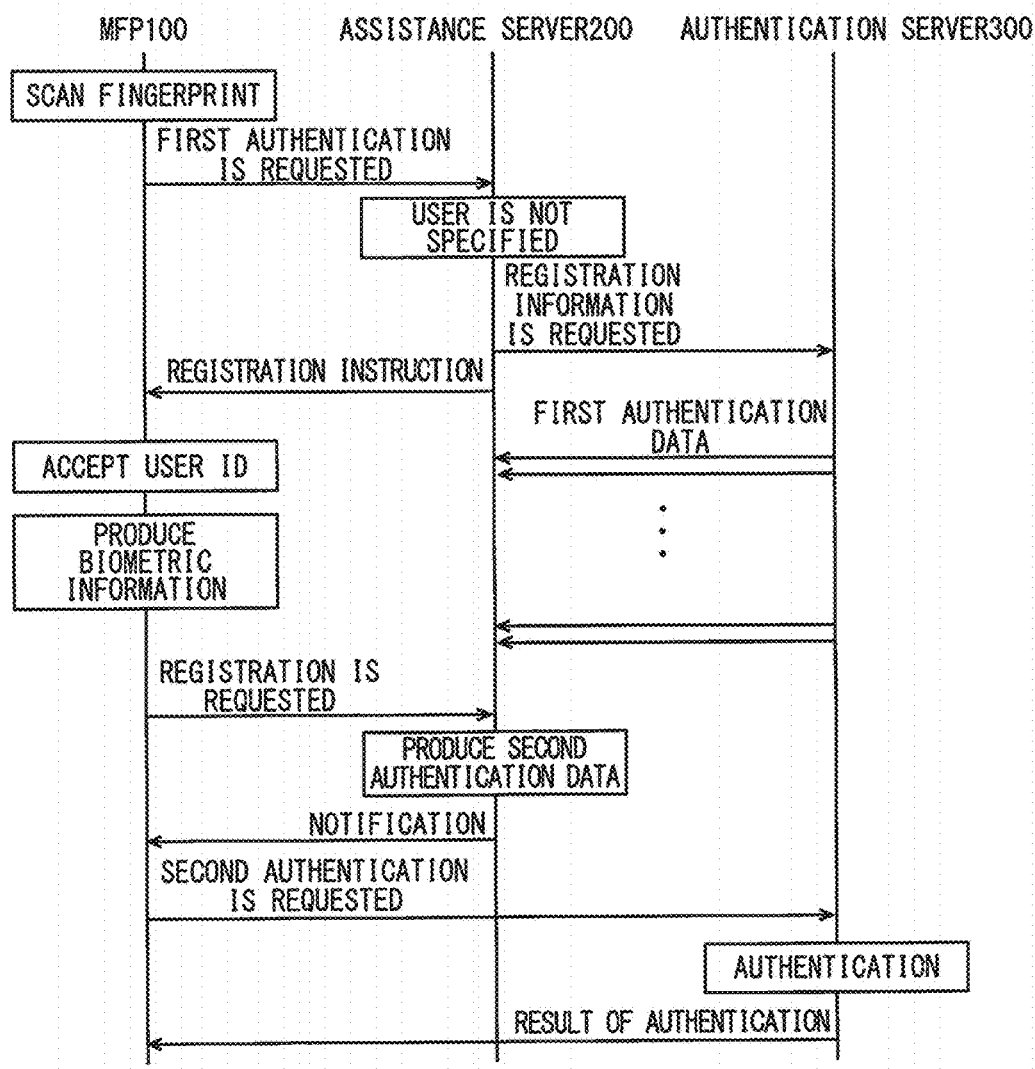
FIG. 5 is a diagram for explaining a registration process of second authentication information by the authentication system.

FIG. 5 is a diagram for explaining a registration process of second authentication information executed by the authentication system. When the assistance server 200 is added to the authentication system 1, the second authentication data is not stored in the assistance server 200. Therefore, the process of registering a user in the assistance server 200 is executed. Referring to FIG. 5, a user first causes the MFP 100 to scan his or her fingerprint. The MFP 100 produces biometric information from the image obtained by scanning of the fingerprint and requests the assistance server 200 to perform first authentication.

When the MFP 100 requests authentication, the assistance server 200 refers to second authentication data. However, because second authentication data is not registered, the assistance server 200 cannot specify the second authentication record including the second authentication information similar to the biometric information and does not specify the user. In this case, the assistance server 200 requests the authentication server 300 to provide registration information and instructs the MFP 100 to register. When the registration information is requested, the authentication server 300 transmits first authentication data to the assistance server. In response, the assistance server 200 starts receiving the first authentication data. Further, when being instructed to register by the assistance server 200, the MFP 100 accepts a user ID and produces biometric information. In the MFP 100, the biometric information is produced based on a plurality of images obtained by scanning of a user's fingerprint multiple times. Therefore, it requires a predetermined period of time to produce the biometric information. The user ID may be accepted after the biometric information is produced. After the biometric information is produced and the user ID is accepted, the MFP 100 requests the assistance server 200 to register.

When being requested to register by the MFP 100, the assistance server 200 produces and stores the second authentication data that associates the first authentication data with the second authentication information. In the case where an amount of data of the first authentication data is equal to or smaller than a predetermined value, the process of receiving the first authentication data from the authentication server 300 in the assistance server 200 completes by the time registration is requested by the MFP 100 since the MFP 100 is instructed to register.

The assistance server 200 specifies the second authentication record including the second authentication information similar to the biometric information produced by the MFP 100 with reference to the produced second authentication data and specifies the user. Then, the assistance server 200 notifies the MFP 100 of the user ID and the password of the specified user. In response to being notified by the assistance server 200, the MFP 100 requests the authentication server 300 to execute second authentication using the user ID and the password.

When being requested to perform authentication by the MFP 100, the authentication server 300 performs authentication with reference to the first authentication data. Then, the authentication server 300 transmits a result of authentication to the MFP 100.

Figure 6:
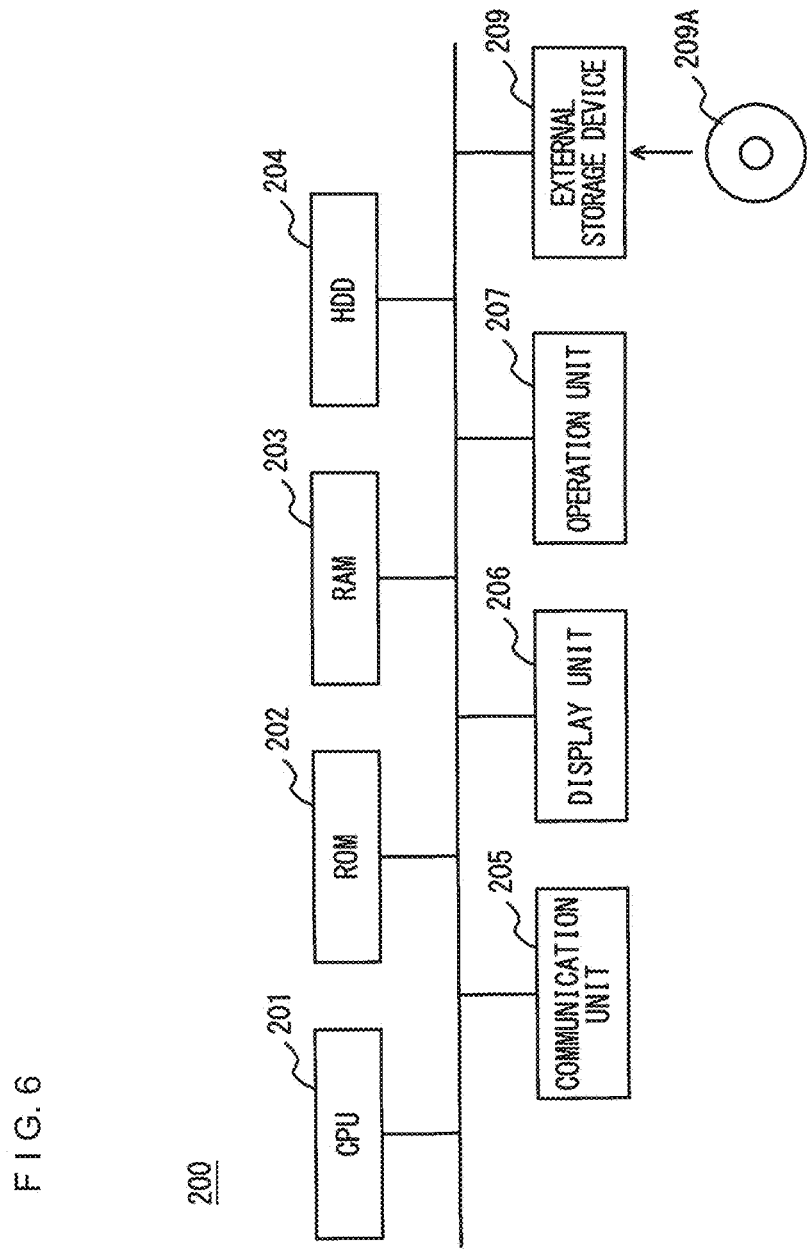
FIG. 6 is a block diagram showing one example of the outline of a hardware configuration of an assistance server in the present embodiment.

FIG. 6 is a block diagram showing one example of the outline of the hardware configuration of the assistance server in the present embodiment. Referring to FIG. 6, the assistance server 200 includes a CPU 201 for controlling the assistance server 200 as a whole, a ROM 202 for storing a program to be executed by the CPU 201, a RAM 203 that is used as a work area for the CPU 201, a HDD 204 for storing data in a non-volatile manner, a communication unit 205 that connects the CPU 201 to the network 3, a display unit 206 that displays information, an operation unit 207 that accepts input by a user's operation and an external storage device 209.

While not being restricted, the display unit 206 is a liquid crystal display device. An organic EL display may be used instead of a liquid crystal display device.

The external storage device 209 is mounted with a CD-ROM (Compact Disc Read Only Memory) 209A. While executing a program stored in the ROM 202 in the present embodiment by way of example, the CPU 201 may control the external storage device 209 to read the program that is to be executed by the CPU 201 from the CD-ROM 209A and store the read program in the RAM 203 for execution.

A recording medium for storing a program to be executed by the CPU 201 is not limited to the CD-ROM 209A but may be a flexible disk, a cassette tape, an optical disc (MO (Magnetic Optical Disc)/MD (Mini Disc)/DVD (Digital Versatile Disc)), an IC card, an optical card, or a semiconductor memory such as a mask ROM or an EPROM (Erasable Programmable ROM). Further, the CPU 201 may load the program stored in the HDD 204 into the RAM 203 for execution. The programs stored in the HDD 204 include a program downloaded by the CPU 201 from a computer connected to the Internet or a program written in the HDD 204 by a computer connected to the Internet. The program referred to here includes not only a program directly executable by the CPU 201 but also a source program, a compressed program, an encrypted program and the like.

The hardware configuration and functions of the MFPs 100, 100A, 100B are basically the same. Therefore, the MFP 100 is described as an example in the following description unless otherwise stated.

Figure 7:
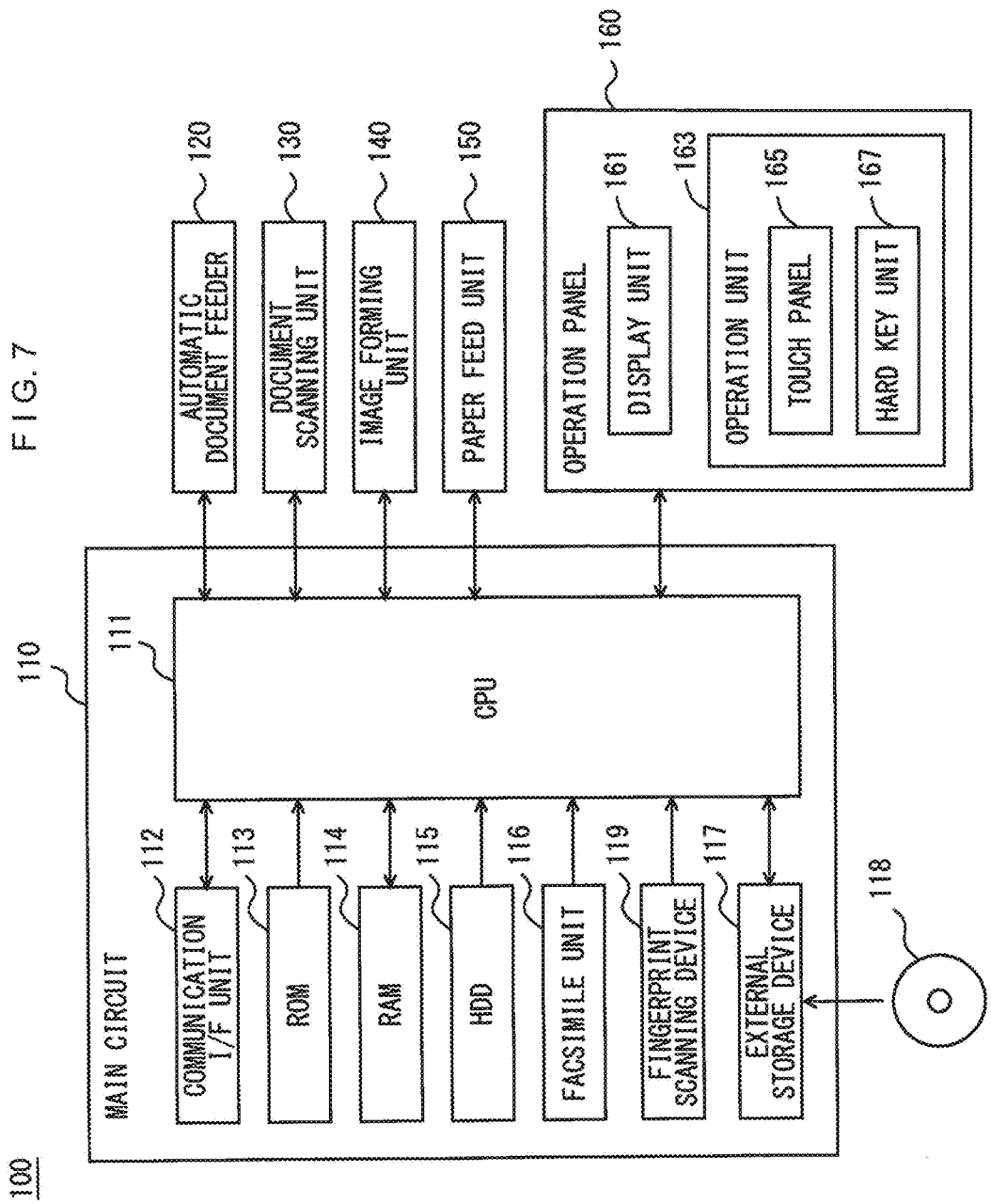
FIG. 7 is a block diagram showing the outline of a hardware configuration of an MFP in the present embodiment.

FIG. 7 is a block diagram showing the outline of the hardware configuration of the MFP in the present embodiment. Referring to FIG. 7, the MFP 100 that functions as an image processing apparatus includes a main circuit 110, a document scanning unit 130 for scanning a document, an automatic document feeder 120 for conveying a document to the document scanning unit 130, an image forming unit 140 for forming an image on a paper (a sheet of paper) or the like based on image data that is output by the document scanning unit 130 that has scanned a document, a paper feed unit 150 for supplying papers to the image forming unit 140 and an operation panel 160 serving as a user interface.

The automatic document feeder 120 automatically conveys a plurality of documents set on a document tray to a predetermined document scan position set on a platen glass of the document scanning unit 130 one by one, and discharges the document including an image that is scanned by the document scanning unit 130 onto a document discharge tray. The document scanning unit 130 includes a light source that irradiates the document that has been conveyed to the document scan position with light and an optoelectronic transducer that receives the light reflected by the document, and scans the document image according to a size of the document. The optoelectronic transducer converts the received light into image data, which is an electric signal, and outputs the image data to the image forming unit 140. The paper feed unit 150 conveys a paper stored in the paper feed tray to the image forming unit 140.

The image forming unit 140 forms an image by a well-known electrophotographic method. The image forming unit 140 forms an image on the paper that has been conveyed by the paper feed unit 150, based on the processed image data obtained when various data processing such as shading correction is performed on the image data received from the document scanning unit 130 or the externally received image data, and discharges the paper having an image formed thereon to the discharge tray.

The main circuit 110 includes a CPU (Central Processing Unit) 111 for controlling the MFP 100 as a whole, a communication interface (I/F) 112, a ROM 113, a RAM 114, a hard disc drive (HDD) 115 that is used as a mass storage device, a facsimile unit 116, a fingerprint scanning device 119 and an external storage device 117. The CPU 111 is connected to the automatic document feeder 120, the document scanning unit 130, the image forming unit 140, the paper feed unit 150 and the operation panel 160, and controls the MFP 100 as a whole.

The facsimile unit 116 is connected to the Public Switched Telephone Network (PSTN), transmits facsimile data to the PSTN or receives facsimile data from the PSTN. The facsimile unit 116 stores the received facsimile data in the HDD 115, converts the received facsimile data into print data that can be printed in the image forming unit 140 and outputs the print data to the image forming unit 140. Thus, the image forming unit 140 forms an image on a paper based on the facsimile data received from the facsimile unit 116. Further, the facsimile unit 116 converts the data stored in the HDD 115 into facsimile data and transmits the converted facsimile data to a facsimile machine connected to the PSTN.

The fingerprint scanning device 119 is controlled by the CPU 111, optically scans a human fingerprint and outputs an image obtained by scanning to the CPU 111. While the fingerprint scanning device 119 is described here as one example of a device for scanning a human biometric feature, a device for scanning another biometric feature is installed in the case where the other biometric feature different from a human fingerprint is to be used.

The communication I/F unit 112 is an interface for connecting the MFP 100 to the network 3. The communication I/F unit 112 communicates with another computer or a data processing apparatus connected to the network 3 using a communication protocol such as a TCP (Transmission Control Protocol) or a FTP (File Transfer Protocol).

The ROM 113 stores a program to be executed by the CPU 111 or data required for execution of the program. The RAM 114 is used as a work area when the CPU 111 executes the program. Further, the RAM 114 temporarily stores the scan images successively sent from the document scanning unit 130.

The operation panel 160 is provided on an upper surface of the MFP 100. The operation panel 160 includes a display unit 161 and an operation unit 163. The display unit 161 is a Liquid Crystal Display (LCD), for example, and displays instruction menus to users, information about the acquired image data and the like. As long as displaying images, an organic EL (Electroluminescence) display, for example, can be used instead of the LCD.

The operation unit 163 includes a touch panel 165 and a hard key unit 167. The touch panel 165 is a capacitance type. Not only the capacitance type but also other types such as a resistive film type, a surface acoustic wave type, an infrared type and an electromagnetic induction type can be used for the touch panel 165. The hard key unit 167 includes a plurality of hard keys. The hard keys are contact switches, for example.

The external storage device 117 is controlled by the CPU 111 and mounted with a CD-ROM 118. While executing a program stored in the ROM 113 in the present embodiment by way of example, the CPU 111 may control the external storage device 117, read the program to be executed by the CPU 111 from the CD-ROM 118, store the read program in the RAM 102 and execute the program.

A recording medium for storing a program to be executed by the CPU 111 is not limited to the CD-ROM 118 but may be a flexible disc, a cassette tape, an optical disc, an IC card, an optical card, a semiconductor memory or the like. Further, the CPU 111 may download a program from a computer connected to the network 3 and store the program in the HDD 115. Alternatively, the computer connected to the network 3 may write a program in the HDD 115, and then the program stored in the HDD 115 may be loaded into the RAM 114 to be executed in the CPU 111. The program referred to here includes not only a program directly executable by the CPU 111 but also a source program, a compressed program, an encrypted program and the like.

Figure 8:
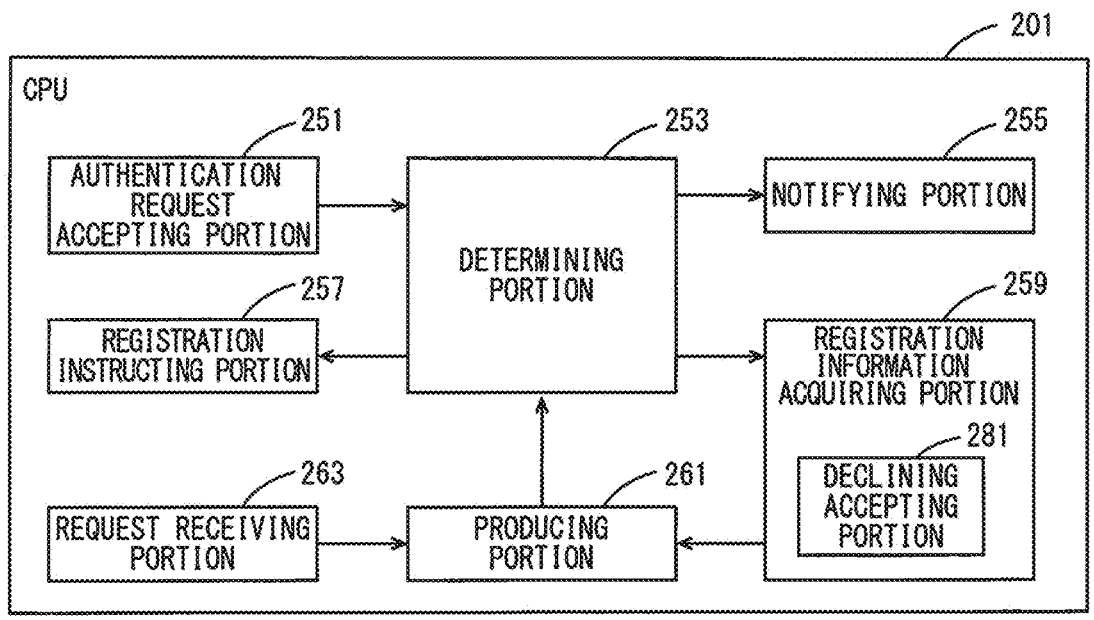
FIG. 8 is a block diagram showing one example of the functions of a CPU included in the assistance server in the present embodiment.

FIG. 8 is a block diagram showing one example of the functions of the CPU included in the assistance server in the present embodiment. The functions shown in FIG. 8 may be implemented by hardware, or may be implemented by the CPU 201 when the CPU 201 included in the assistance server 200 executes the assistance program stored in the ROM 202, the HDD 204 or the CD-ROM 209A. Referring to FIG. 8, the CPU 201 included in the assistance server 200 includes an authentication request accepting portion 251, a determining portion 253, a notifying portion 255, a registration instructing portion 257, a registration information acquiring portion 259, a producing portion 261 and a registration request accepting portion 263.

The authentication request accepting portion 251 accepts a request for authentication from any one of MFPs 100, 100A, 100B. Specifically, in the case where operating the MFP 100, a user causes the MFP 100 to scan his or her fingerprint, for example. The MFP 100 requests authentication in the following description by way of example. The MFP 100 scans the user's fingerprint by the fingerprint scanning device 119 and produces biometric information from the image obtained by scanning of the fingerprint. The MFP 100 transmits a first authentication request command including the biometric information to the assistance server 200. When the communication unit 205 receives the first authentication request command from the MFP 100, the authentication request accepting portion 251 accepts the request for authentication. The authentication request accepting portion 251 outputs the biometric information included in the first authentication request command to the determining portion 253.

In response to receiving the biometric information of the user from the authentication request accepting portion 251, the determining portion 253 determines the first authentication data corresponding to the user with reference to the second authentication data stored in the HDD 204. The second authentication data is produced by the below-mentioned producing portion 261 and stored in the HDD 204. Specifically, the determining portion 253 compares the biometric information received from the authentication request accepting portion 251 with the second authentication information included in the second authentication data stored in the HDD 204 and specifies the second authentication record including the second authentication information similar to the biometric information of the user. In the case where specifying the second authentication record, the determining portion 253 determines the user ID and the first authentication information included in the second authentication record. In the case where the determining portion 253 does not specify a second authentication record, in other words, in the case where the second authentication record including the second authentication information similar to the biometric information of the user is not present, the determining portion 253 does not determine the user ID and the first authentication information. In the case where determining the user ID and the first authentication information, the determining portion 253 outputs a notification instruction to the notifying portion 255. In the case where not determining the user ID and the first authentication information, the determining portion 253 outputs a registration instruction to the registration instructing portion 257 and outputs an acquisition instruction to the registration information acquiring portion 259. The notification instruction includes the user ID and the first authentication information included in the first authentication record.

In the case where receiving the notification instruction, the notifying portion 255 notifies the MFP 100 of the user ID and the first authentication information. Specifically, the notifying portion 255 transmits an authentication instruction command including the user ID and the first authentication information to the MFP 100. The authentication instruction command is a command for instructing the MFP 100 to request the authentication server 300 to perform second authentication. The MFP 100 that receives the authentication instruction command transmits a second authentication request command including the user ID and the first authentication information to the authentication server 300. In the case where receiving the second authentication request command from the MFP 100, the authentication server 300 performs authentication with reference to the first authentication data. Specifically, if the first authentication record including the user ID and the password that are the same as the user ID and the password included in the second authentication request command is present, the authentication server 300 authenticates the user. If not, the authentication server 300 does not authenticate the user. Then, the authentication server 300 transmits the result of authentication to the MFP 100.

In response to receiving the acquisition instruction from the determining portion 253, the registration information acquiring portion 259 acquires the first authentication data from the authentication server 300. Specifically, the registration information acquiring portion 249 requests the authentication server 300 to provide the registration information. When being requested to provide the registration information, the authentication server 300 transmits the first authentication data to the assistance server 200. In response, the registration information acquiring portion 259 receives the first authentication data. The registration information acquiring portion 259 outputs the first authentication data to the producing portion 261.

The registration information acquiring portion 259 includes a declining accepting portion 281. The declining accepting portion 281 accepts an instruction of declining registration by the user who operates the MFP 100. Although the MFP 100 that receives a registration instruction command requests the user to input the user ID and have his or her fingerprint scanned, the user might decline registration. In the case where the user inputs an operation of declining registration, the MFP 100 transmits a registration declining command to the assistance server 200. In the case where receiving the registration declining command from the MFP 100, the declining accepting portion 281 accepts the instruction for declining registration by the user. In the case where the declining accepting portion 281 accepts the instruction for declining registration by the user, the registration information acquiring portion 259 does not request the authentication server 300 to provide registration information and does not acquire first authentication data from the authentication server 300.

In response to receiving the registration instruction from the determining portion 253, the registration instructing portion 257 instructs the MFP 100 to register. Specifically, the registration instructing portion 257 transmits the registration instruction command to the MFP 100. Although details of the operation of the MFP 100 that receives the registration instruction command from the assistance server 200 will be described below, the MFP 100 accepts a user ID and produces biometric information. When producing the biometric information, the MFP 100 scans a user's fingerprint multiple times. Thus, it requires a predetermined period of time to produce the biometric information. The MFP 100 requests the assistance server 200 to register after the user ID is accepted and the biometric information is produced. Specifically, the MFP 100 transmits the user ID to the assistance server in response to acceptance of the user ID, and transmits a registration request command including the biometric information to the assistance server 200 in response to production of the biometric information.

When receiving the registration request command from the MFP 100, the registration request accepting portion 263 outputs a set of the user ID received from the MFP 100 and the biometric information included in the registration request command to the producing portion 261.

Figure 9:
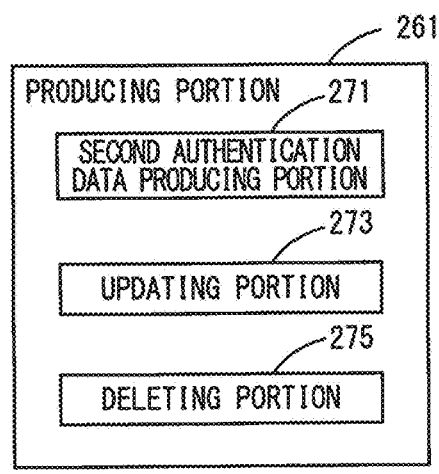
FIG. 9 is a block diagram showing one example of the detailed functions of a producing portion.

FIG. 9 is a block diagram showing one example of the detailed functions of the producing portion. Referring to FIG. 9, the producing portion 261 includes a second authentication data producing portion 271 and an updating portion 273 and a deleting portion 275. If acquisition of the first authentication data by the registration information acquiring portion 259 is completed by the time the set of the user ID and the biometric information is received from the registration request accepting portion 263, the second authentication data producing portion 271 produces second authentication data. If acquisition of the first authentication data by the registration information acquiring portion 259 is not completed by the time the set of the user ID and the biometric information is received from the registration request accepting portion 263, the second authentication data producing portion 271 waits for completion and then produces the second authentication data. Here, the period of time required for the registration information acquiring portion 259 to complete acquisition of the first authentication data after requesting the authentication server 300 to provide the registration information is a first period of time. Further, the period of time required for the registration request accepting portion 263 to receive the registration request command after the registration instructing portion 257 instructs the MFP 100 to register is a second period of time. The first period of time is defined by the amount of data of the first authentication data and a communication speed. The second period of time is defined by the period of time required to scan the biometric feature of the user multiple times in the MFP 100 and the period of time required to produce the biometric information. Therefore, acquisition of the first authentication data by the registration information acquiring portion 259 is likely to be completed by the time the set of the user ID and the biometric information is input from the registration request accepting portion 263 to the second authentication data producing portion 271.

The second authentication data producing portion 271 associates the first authentication information with the second authentication information using the set of the user ID and the biometric information received from the registration request accepting portion 263 and the first authentication data received from the registration information acquiring portion 259. Specifically, the second authentication data producing portion 271 specifies the first authentication data in which the user ID that is the same as the user ID received from the registration request accepting portion 263 is set. Then, the second authentication data producing portion 271 takes the biometric information received from the registration request accepting portion 263 as the second authentication information, and associates the first authentication information included in the first authentication data with the second authentication information. More specifically, the producing portion 261 produces a second authentication record including the user ID and the biometric information received from the registration request accepting portion 263, and the first authentication information included in the first authentication data, and adds the second authentication record to the second authentication data stored in the HDD 204 for storage.

The second authentication data producing portion 271 may cause the user who operates the MFP 100 to input first authentication information, and may produce a second authentication record on the condition that the first authentication record including the first authentication information and a user ID is included in the first authentication data. Thus, it can be confirmed that the biometric information received from the registration request accepting portion 263 is the second authentication information of the user specified by the user ID.

The updating portion 273 updates the second authentication data stored in the HDD 204 with the first authentication data received from the registration information acquiring portion 259. Specifically, the updating portion 273 sequentially selects one or more first authentication records included in the first authentication data received from the registration information acquiring portion 259. If the second authentication record in which the user ID that is the same as the user ID set in the first authentication record is present in the second authentication data stored in the HDD 204, the updating portion 273 updates the first authentication information set in the second authentication record with the first authentication information set in the first authentication record. Thus, in the case where the first authentication information is changed in the authentication server 300, the second authentication record can include the first authentication information that has been changed in the authentication server 300.

The deleting portion 275 deletes the second authentication record based on the first authentication data acquired from the registration information acquiring portion 259. Specifically, the deleting portion 275 sequentially selects one or more second authentication records included in the second authentication data stored in the HDD 204. In the case where the first authentication record in which the user ID that is the same as the user ID set in the second authentication record is not present in the first authentication data, the deleting portion 275 deletes the second authentication record from the second authentication data. Thus, in the case where registration of a user is erased and a first authentication record is deleted from the first authentication data in the authentication server 300, the second authentication data can be consistent with the first authentication data from deletion in the authentication server 300.

Figure 10:
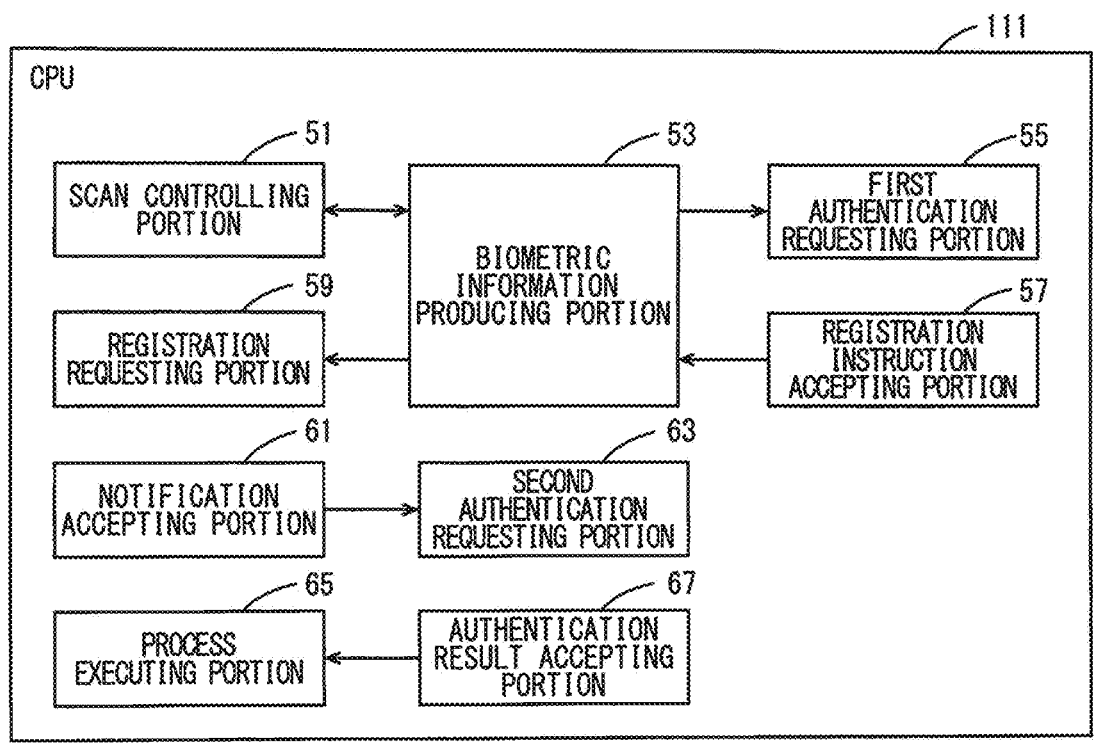
FIG. 10 is a block diagram showing one example of the functions of a CPU included in the MFP in the present embodiment.

FIG. 10 is a block diagram showing one example of the functions of the CPU included in the MFP in the present embodiment. The functions shown in FIG. 10 may be implemented by hardware, or may be implemented by the CPU 111 when the CPU 111 included in the MFP 100 executes a device control program stored in the ROM 113, the HDD 115 or the CD-ROM 118. Referring to FIG. 10, the CPU 111 included in the MFP 100 includes a scan controlling portion 51, a biometric information producing portion 53, a first authentication requesting portion 55, a registration instruction accepting portion 57, a registration requesting portion 59, a notification accepting portion 61, a second authentication requesting portion 63, an authentication result accepting portion 67 and a process executing portion 65.

The scan controlling portion 51 controls the fingerprint scanning device 119 to acquire the data representing a biometric feature of the user and output the data to the biometric information producing portion 53. Specifically, the scan controlling portion 51 causes the fingerprint scanning device 119 to scan a user's fingerprint and acquires the image output by the fingerprint scanning device 119.

The biometric information producing portion 53 analyzes the image received from the scan controlling portion 51 to produce the biometric information, and outputs the biometric information to the first authentication requesting portion 55. For example, the biometric information producing portion 53 extracts the featured portion of the user's fingerprint from the image and produces the biometric information including the featured portion.

The first authentication requesting portion 55 controls the communication I/F unit 112 to transmit the first authentication request command including the biometric information to the assistance server 200.

When the first authentication request command is transmitted by the first authentication requesting portion 55, a result of authentication might be transmitted from the authentication server 300 or a registration instruction command might be transmitted from the assistance server 200.

The registration instruction accepting portion 57 controls the communication I/F unit 112 to receive the registration instruction command transmitted from the assistance server 200. In the case where receiving the registration instruction command from the assistance server 200, the registration instruction accepting portion 57 outputs a production instruction to the biometric information producing portion 53.

In response to receiving the production instruction from the registration instruction accepting portion 57, the biometric information producing portion 53 produces the biometric information. In the case where receiving the production instruction from the registration instruction accepting portion 57, the biometric information producing portion 53 causes the scan controlling portion 51 to scan a user's fingerprint multiple times. For example, the biometric information producing portion 53 causes the display unit 161 to display the message that prompts the user to have his or her fingerprint scanned by the fingerprint scanning device 119, and causes the scan controlling portion 51 to scan the user's fingerprint multiple times while the user has his or her finger placed on the fingerprint scanning device 119. The biometric information producing portion 53 analyzes a plurality of images output from the fingerprint scanning device 119 and produces the biometric information. Because the biometric information producing portion 53 produces the biometric information using the plurality of images, accuracy of the biometric information that is registered as the second authentication information can be increased. The biometric information producing portion 53 outputs the biometric information to the registration requesting portion 59.

The registration requesting portion 59 accepts a user ID input by the user in the operation unit 163. For example, the message that prompts the user to input the user ID is displayed in the display unit 161, and the registration requesting portion 59 accepts the user ID accepted by the operation unit 163. The registration requesting portion 59 transmits the user ID to the assistance server 200 in response to acceptance of the user ID. Further, the registration requesting portion 59 transmits a registration request command including the biometric information to the assistance server 200 in response to receiving the biometric information from the biometric information producing portion 53.

The notification accepting portion 61 controls the communication I/F unit 112 to receive an authentication instruction command transmitted from the assistance server 200. In response to receiving the authentication instruction command, the notification accepting portion 61 outputs an authentication instruction to the second authentication requesting portion 63. The authentication instruction includes the user ID and the first authentication information included in the authentication instruction command.

In response to receiving the authentication instruction from the notification accepting portion 61, the second authentication requesting portion 63 requests the authentication server 300 to perform authentication of the user. Specifically, the second authentication requesting portion 63 transmits a second authentication request command including the user ID and the first authentication information included in the authentication instruction to the authentication server 300. When receiving the second authentication request command, the authentication server 300 performs authentication with reference to the first authentication data and returns a result of authentication. Specifically, if the first authentication record including the user ID and the password that are the same as the user ID and the password included in the second authentication request command is present, the authentication server 300 authenticates the user. If not, the authentication server 300 does not authenticate the user. Then, the authentication server 300 transmits the result of authentication to the MFP 100.

The authentication result accepting portion 67 controls the communication I/F unit 112 to receive the result of authentication transmitted from the authentication server 300. In the case where the authentication result accepting portion 67 receives the result of authentication from the authentication 300, when the result of authentication indicates successful authentication, the authentication result accepting portion 67 permits the process executing portion 65 to execute a process. If the result of authentication indicates unsuccessful authentication, the authentication result accepting portion 67 does not permit the process executing portion 65 to execute a process. In the case where execution of a process is permitted, the process executing portion 65 executes the process according to an operation input to the operation unit 163 by the user. In the case where execution of a process is not permitted, the process executing portion 65 does not accept an operation input to the operation unit 163 by the user and does not execute the process.

Figure 11:
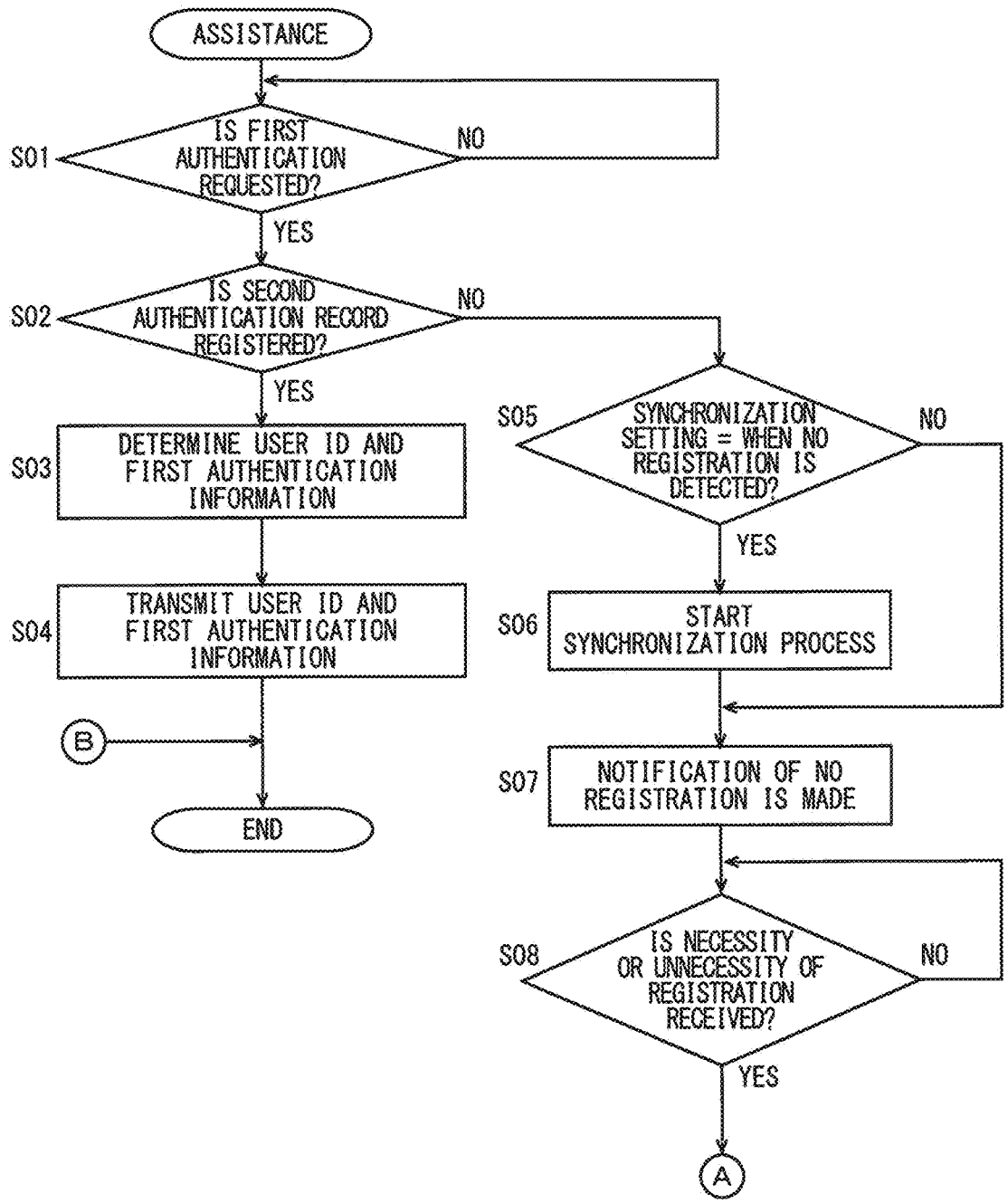
FIG. 11 is a first flowchart showing one example of a flow of an assistance process.

FIG. 11 is a first flowchart showing one example of a flow of an assistance process. FIG. 12 is a second flowchart showing the one example of the flow of the assistance process. The assistance process is a process executed by the CPU 201 when the CPU 201 included in the assistance server 200 executes the assistance program stored in the ROM 202, the HDD 204 or the CD-ROM 209A.

Referring to FIGS. 11 and 12, the CPU 201 determines whether a first authentication request has been accepted from any one of the MFPs 100, 100A, 100B (step S01). The CPU 201 waits until the communication unit 205 receives a first authentication request command from any one of the MFPs 100, 100A, 100B (NO in the step S01). When the first authentication request command is received (YES in the step S01), the process proceeds to the step S02. Here, the first authentication request command is received from the MFP 100 by way of example.

In the step S02, the CPU 201 determines whether the second authentication record corresponding to the first authentication request command is registered in the second authentication data. The CPU 201 determines whether the second authentication data stored in the HDD 204 includes a second authentication record in which the second authentication information similar to the biometric information included in the first authentication request command is set. If the second authentication data includes such a second authentication record, the process proceeds to the step S03. If not, the process proceeds to the step S05. In order to deal with the case where a scanning state of a fingerprint is not good when the biometric information included in the first authentication request command is produced in the MFP 100, in the case where the degree of similarity between the biometric information included in the first authentication request command and the second authentication information included in the second authentication record is smaller than a first threshold value but larger than a second threshold value, the CPU 201 may request the MFP 100 to transmit the biometric information and cause the MFP 100 to rescan the fingerprint. The second threshold value is smaller than the first threshold value. In this case, with a predetermined number of times set as an upper limit, the CPU 201 causes the MFP 100 to produce the biometric information until the degree of similarity between the biometric information and the second authentication information included in the second authentication record becomes smaller than the first threshold value.

In the step S03, the CPU 201 determines the user ID and the first authentication information, and the process proceeds to the step S04. The user ID and the first authentication information set in the second authentication record in which the second authentication information similar to the biometric information included in the first authentication request command is set are determined. In the step S04, the user ID and the first authentication information are transmitted to the MFP 100, and the process ends.

In the step S05, the CPU 201 determines whether "when no registration is detected" is set in a synchronization setting. In the synchronization setting, a predetermined value is set as timing for starting a synchronization process. In the synchronization setting, the values include "when no registration is detected" that represents the time of detection that biometric information is not registered, "when registration is requested" that represents the time when a user requests registration, and "when a user ID is received" that represents the time when a user inputs a user ID. In the case where "when no registration is detected" is set in the synchronization setting, the process proceeds to the step S06. If not, the process skips the step S06 and proceeds to the step S07. The synchronization process is started in the step S06, and the process proceeds to the step S07. Details of the synchronization process will be described below.

In the step S07, the CPU 201 notifies the MFP 100 that biometric information is not registered. Specifically, a registration notification command is transmitted to the MFP 100. In the next step S08, the CPU 201 determines whether necessity or unnecessity of registration is received. When being notified of no registration, the MFP 100 inquires whether the user wishes to register biometric information and returns a result of determination that represents necessity or unnecessity of registration and is provided and input by the user. In the step S08, the process waits until the result of determination by the user is received from the MFP 100 (NO in the step S08). When the result of determination is received (YES in the step S09), the process proceeds to the step S09.

In the step S09, the process branches depending on the result of determination. If the result of determination indicates a request for registration, the process proceeds to the step S10. If not, the process proceeds to the step S24. In the step S24, the MFP 100 is notified of the result of registration indicating unsuccessful registration, and the process ends.

In the step S10, the CPU 201 instructs the MFP 100 to register, and the process proceeds to the step S11. Specifically, a registration instruction command is transmitted to the MFP 100. In the step S11, the CPU 201 determines whether a registration request has been made by the MFP 100. The process waits until a registration request command is received from the MFP 100 (NO in the step S11). When the registration request command is received (YES in the step S11), the process proceeds to the step S12.

In the step S12, the CPU 201 determines whether "when registration is required" is set in the synchronization setting. If "when registration is required" is set in the synchronization setting, the process proceeds to the step S13. If not, the process proceeds to the step S14. The synchronization process is started in the step S13, and the process proceeds to the step S14.

In the step S14, the process waits until a user ID is received from the MFP 100 (NO in the step S14). When the user ID is received (YES in the step S14), the process proceeds to the step S15. In the step S15, whether "when a user ID is received" is set in the synchronization setting. If "when a user ID is received" is set in the synchronization setting, the process proceeds to the step S16. If not, the process proceeds to the step S17. The synchronization process is started in the step S16, and the process proceeds to the step S17.

In the step S17, the CPU 201 determines whether the synchronization process has ended. The process waits until the synchronization process ends (NO in the step S17). When the synchronization process ends (YES in the step S17), the process proceeds to the step S18. The user ID of the user to be registered is specified in the step S18, and the process proceeds to the step S19. Specifically, the user ID received in the step S14 is specified.

The first authentication record is specified in the step S19, and the process proceeds to the step S20. Because the synchronization process has ended before execution of the step S19, the CPU 201 specifies the first authentication record including the user ID that is the same as the user ID specified in the step S18 from the first authentication data received from the authentication server 300.

The second authentication record is produced in the step S20, and the process proceeds to the step S21. The second authentication record that includes the user ID specified in the step S18, the second authentication information included in the registration request command received in the step S11 and the first authentication information included in the first authentication record specified in the step S19 is produced.

The second authentication record is added to the second authentication data stored in the HDD 204 in the step S21, and the process proceeds to the step S22. In the step S22, the MFP 100 is notified of the result of registration. An update-delete process is executed in the next step S23, and the process ends.

Figure 13:
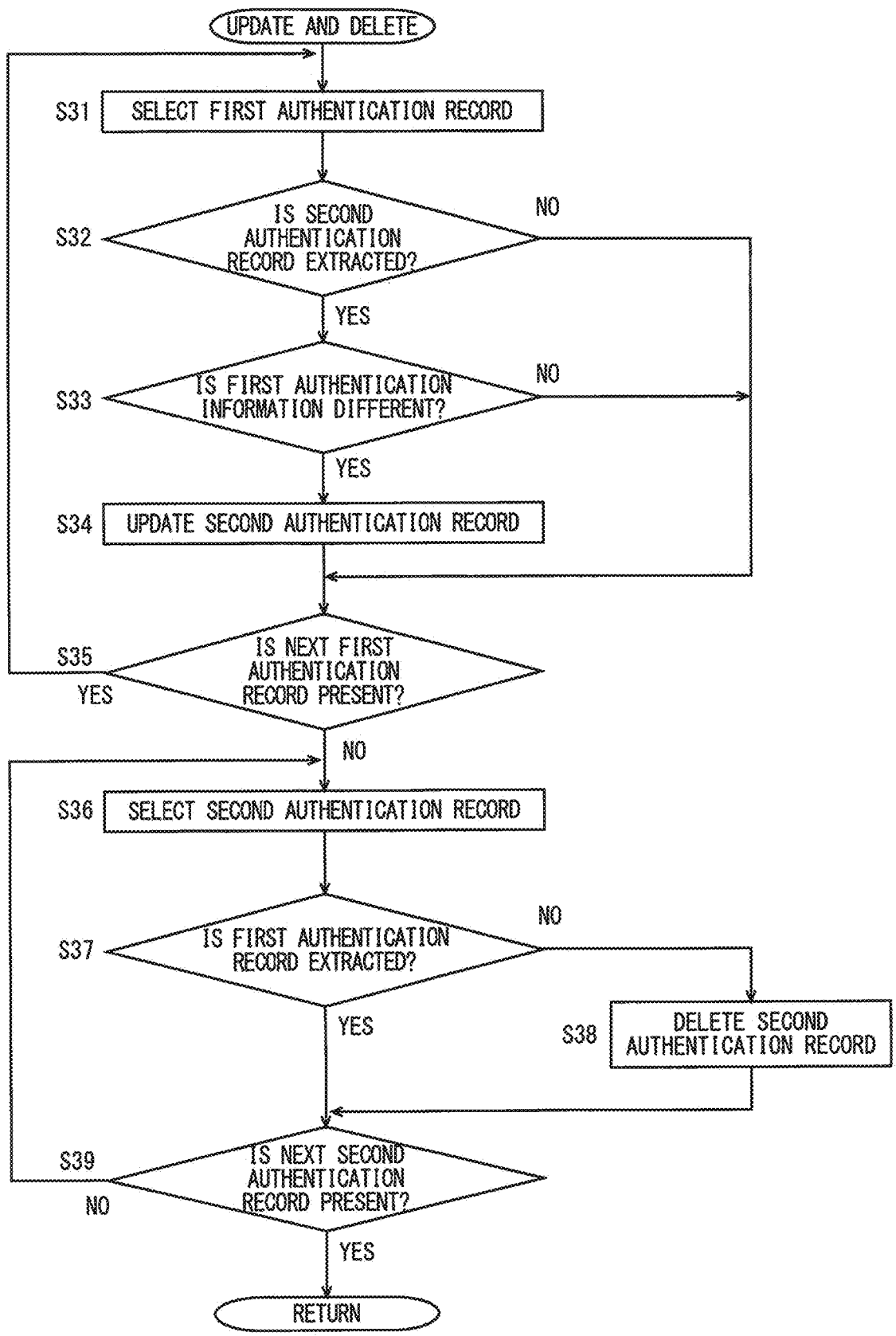
FIG. 13 is a flowchart showing one example of a flow of an update-delete process.

FIG. 13 is a flowchart showing one example of a flow of the update-delete process. The update-delete process is a process executed in the step S23 of the assistance process. Referring to FIG. 13, the CPU 201 selects the first authentication record to be processed from the first authentication data (step S31), and the process proceeds to the step S32.

In the step S32, the CPU 201 determines whether the second authentication record corresponding to the first authentication record is extracted from the second authentication data. The CPU 201 determines whether the second authentication data includes the second authentication record in which the user ID that is the same as the user ID of the first authentication record is set. If the second authentication data includes such a second authentication record, the second authentication record is extracted, and the process proceeds to the step S33. If the second authentication data does not include such a second authentication record, the process proceeds to the step S35.

In the step S33, the CPU 201 determines whether the first authentication information of the first authentication record that is selected as a process subject is different from the first authentication information of the second authentication record extracted in the step S32. If they are different from each other, the process proceeds to the step S34. If not, the process proceeds to the step S35. The second authentication record is updated in the step S34, and the process proceeds to the step S35. The first authentication information of the second authentication record extracted in the step S32 is updated with the first authentication information of the first authentication record that is selected as a process subject in the step S31.

In the step S35, the CPU 201 determines whether a first authentication record that is not selected as a process subject is present. If an unselected first authentication record is present, the process returns to the step S31. If not, the process proceeds to the step S36.

The second authentication record to be processed is selected from the second authentication data in the step S36, and the process proceeds to the step S37. In the step S37, the CPU 201 determines whether the first authentication record corresponding to the second authentication record is extracted from the first authentication data. The CPU 201 determines whether the first authentication data includes the first authentication record in which the user ID that is the same as the user ID of the second authentication record is set. If the first authentication data includes such a first authentication record, the first authentication record is extracted, and the process proceeds to the step S39. If the first authentication data does not include such a first authentication record, the process proceeds to the step S38. The second authentication record that is selected as a process subject is deleted from the second authentication data in the step S38, and the process proceeds to the step S39. In the step S39, the CPU 201 determines whether a second authentication record that is not selected as a process subject is present. If an unselected second authentication record is present, the process returns to the step S36. If not, the process returns to the assistance process.

Figure 14:
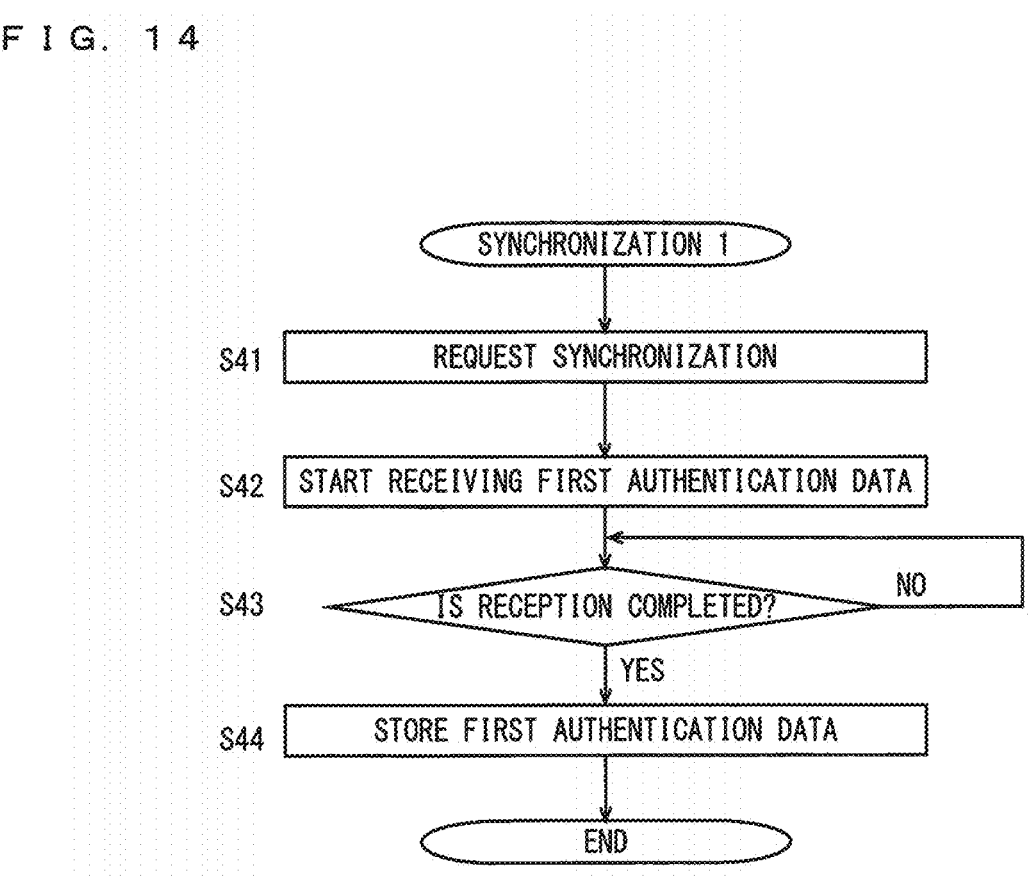
FIG. 14 is a flowchart showing one example of a flow of a synchronization process.

FIG. 14 is a flowchart showing one example of a flow of the synchronization process. The synchronization process is a process executed by the CPU 201 when the CPU 201 included in the assistance server 200 executes a synchronization program stored in the ROM 202, the HDD 204 or the CD-ROM 209A. The synchronization program is part of the assistance program. Referring to FIG. 14, the CPU 201 requests the authentication server 300 to perform synchronization (step S41), and the process proceeds to the step S42. The request for synchronization is a request for first authentication data. The authentication server 300 that is requested to perform synchronization returns the first authentication data.

Reception of the first authentication data transmitted from the authentication server 300 is started in the step S42, and the process proceeds to the step S43. In the step S43, the CPU 201 determines whether reception of the first authentication data has completed. The process waits until reception of the first authentication data is completed (NO in the step S43). When reception of the first authentication data is completed (YES in the step S43), the process proceeds to the step S44. In the step S44, the first authentication data is stored, and the process ends.

FIG. 15 is a flowchart showing one example of a flow of a device control process. The device control process is a process executed by the CPU 111 when the CPU 111 included in the MFP 100 executes a device control program stored in the ROM 113, the HDD 115 or the CD-ROM 118. Referring to FIG. 15, the CPU 111 included in the MFP 100 determines whether a fingerprint has been input (step S71). The CPU 111 determines that the fingerprint has been input in the case where the fingerprint scanning device 119 scans a user's fingerprint and outputs an image. The process waits until the fingerprint is input (NO in the step S71). When the fingerprint is input (YES in the step S71), the process proceeds to the step S72.

The assistance server 200 is requested to perform first authentication in the step S72, and the process proceeds to the step S73. Specifically, biometric information is produced based on the image that is output by the fingerprint scanning device 119 that has scanned the fingerprint, and a first authentication request command including the biometric information is transmitted to the assistance server 200. In the step S73, the CPU 111 determines whether a user ID and first authentication information have been received. If the user ID and the first authentication information are received from the authentication server 300, the process proceeds to the step S74. If not, the process proceeds to the step S81.

In the step S74, the authentication server 300 is requested to perform second authentication. Specifically, a second authentication request command including the user ID and the first authentication information is transmitted to the authentication server 300. In the next step S75, an authentication-in-progress screen is displayed in the display unit 161, and the process proceeds to the step S76. The authentication-in-progress screen is a screen for notifying the user that authentication is in progress. For example, the authentication-in-progress screen includes a message "Authentication is in progress."

In the step S76, the CPU 111 determines whether a result of authentication has been received from the authentication server 300. The process waits until the result of authentication is received (NO in the step S76). When the result of authentication is received (YES in the step S76), the process proceeds to the step S77. In the step S77, the CPU 111 determines whether the result of authentication indicates successful authentication. If the result of authentication indicates successful authentication, the process proceeds to the step S78. If not, the process proceeds to the step S88. The user is notified of unsuccessful authentication in the step S88, and the process ends. For example, an error message indicating unsuccessful authentication is displayed in the display unit 161.

A user's operation of inputting in the operation unit 163 is accepted in the step S78, and the process proceeds to the step S79. The process is executed according to the operation input by the user in the step S79, and the process proceeds to the step S80. In the step S80, the CPU 111 determines whether the user has logged out. If the user has logged out, the process ends. If not, the process returns to the step S78.

In the step S81, the CPU 111 determines whether a no-registration notification has been accepted. In the case where a registration notification command is received from the assistance server 200, the no-registration notification is accepted. If the no-registration notification is accepted, the process proceeds to the step S82. If not, the process returns to the step S73. A registration necessity checking screen is displayed in the step S82, and the process proceeds to the step S83.

Figure 16:
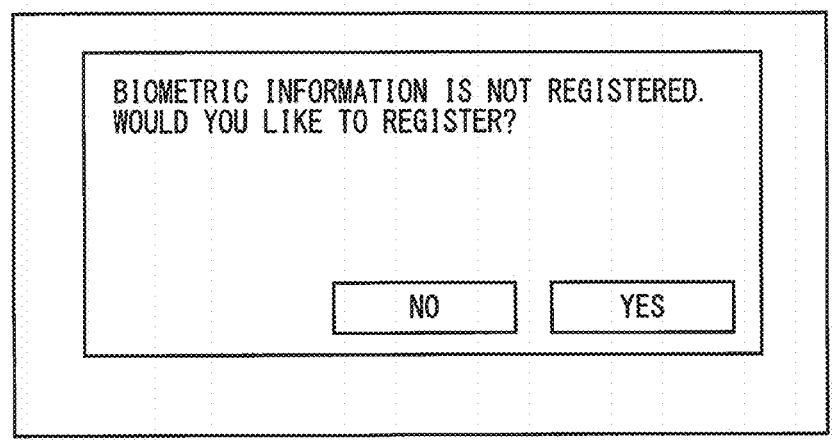
FIG. 16 is a diagram showing one example of a registration necessity checking screen.

FIG. 16 is a diagram showing one example of the registration necessity checking screen. The registration necessity checking screen is a screen for checking with user in regard to registration of second authentication information. The registration necessity checking screen includes the message "Biometric information is not registered. Would you like to register?," the button in which the characters "NO" is shown and the button in which the characters "YES" is shown. When the user designates the button in which the characters "YES" is shown, an operation of providing an instruction for registration is accepted. When the user designates the button in which the characters "NO" is shown, an operation of declining registration is accepted.

Returning to FIG. 15, whether registration is necessary is transmitted to the assistance server 200 in the step S83, and the process proceeds to the step S84. In the step S84, the CPU 111 determines whether an instruction for registering second authentication information has been provided by the assistance server 200. If the communication I/F unit 112 receives a registration instruction command from the assistance server 200, the CPU 111 determines that the instruction for registration of the second authentication information has been provided. If the instruction for registration of the second authentication information has been provided, the process proceeds to the step S85. If not, the process proceeds to the step S88. The registration process is executed in the step S85, and the process proceeds to the step S86. Although details of the registration process will be described below, the registration process is a process of scanning a fingerprint of the user who operates the MFP 100 and registering biometric information in the assistance server 200.

In the step S86, the CPU 101 determines whether a result of registration has been received. The process waits until the result of registration is received from the assistance server 200 (NO in the step S86). When the result of registration is received from the assistance server 200 (YES in the step S86), the process proceeds to the step S87. In the step S87, the CPU 111 determines whether registration has been successful. If the result of registration output from the assistance server 200 indicates successful registration, the process proceeds to the step S74. If not, the process proceeds to the step S88. The user is notified of unsuccessful registration in the step S88, and the process ends.

Figure 17:
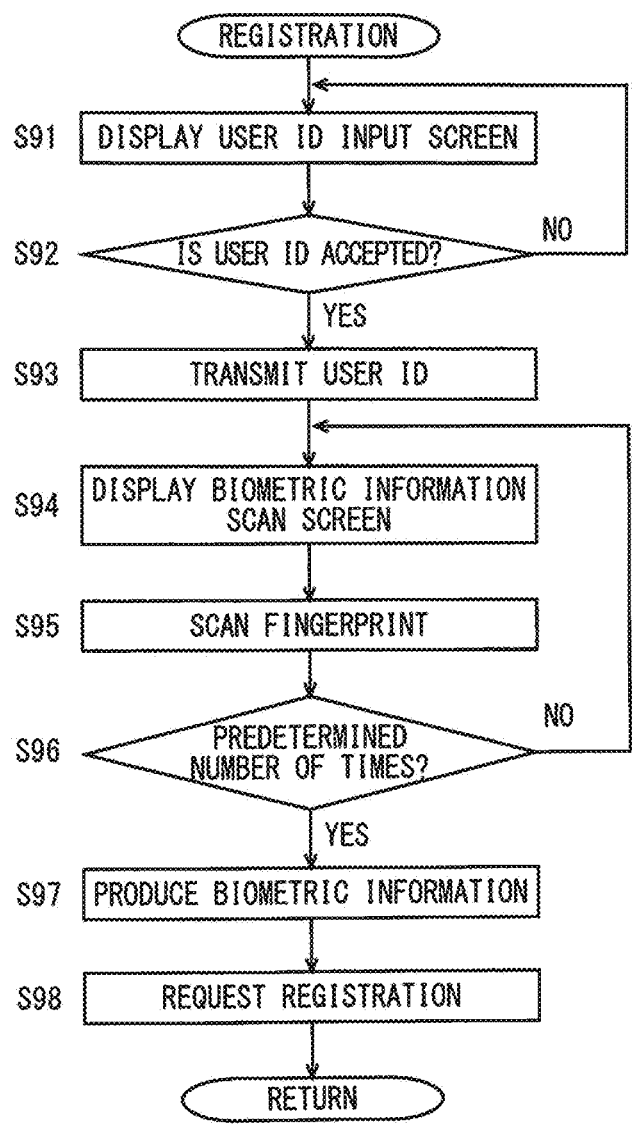
FIG. 17 is a flowchart showing one example of a flow of a registration process.

FIG. 17 is a flowchart showing one example of a flow of the registration process. The registration process is a process executed in the step S85 of the device control process. Referring to FIG. 17, a user ID input screen is displayed in the display unit 161 (step S91), and the process proceeds to the step S92.

Figure 18:
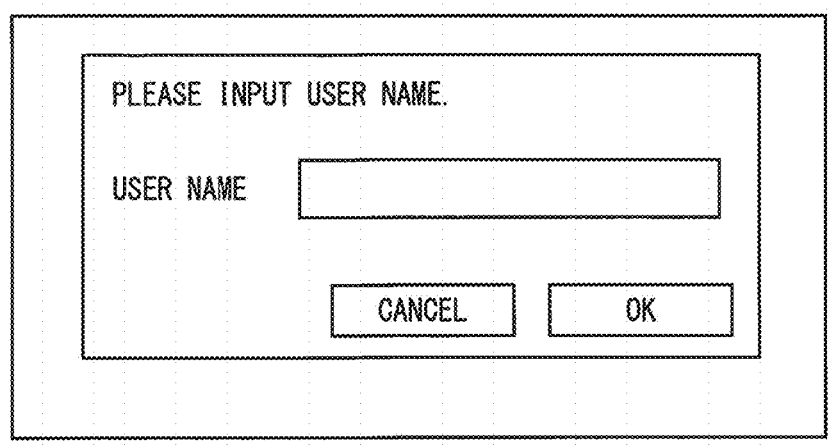
FIG. 18 is a diagram showing one example of a user ID input screen.

FIG. 18 is a diagram showing one example of the user ID input screen. The user ID input screen is a screen for prompting the user to input a user ID and accepting the user ID input by the user. The user ID input screen includes the message "Please input your user ID," an input field for accepting the input of the user ID, the button in which the characters "OK" is shown and the button in which the characters "CANCEL" is shown. When the user inputs the user ID in the input field, the user ID is accepted.

Returning to FIG. 17, in the step S92, the CPU 111 determines whether the user ID has been accepted. If the user ID is accepted, the process proceeds to the step S93. If not, the process returns to the step S91. The user ID is transmitted to the assistance server 200 in the step S93, and the process proceeds to the step S94. A biometric information scan screen is displayed in the display unit 161 in the step S94, and the process proceeds to the step S95.

FIG. 19 is a diagram showing one example of the biometric information scan screen. The biometric information scan screen is a screen for prompting the user to have his or her fingerprint scanned by the fingerprint scanning device 119. The biometric information scan screen includes the message "Please place your finger on a fingerprint scanning device."

Returning to FIG. 17, the fingerprint scanning device 119 is controlled and the fingerprint is scanned in the step S95, and the process proceeds to the step S96. In the step S96, the CPU 111 determines whether the number of times the fingerprint scanning device 119 has scanned the fingerprint is equal to or larger than a predetermined number. If the fingerprint is scanned the predetermined number of times or more, the process proceeds to the step S97. If not, the process returns to the step S94. Therefore, a certain number of images are output from the fingerprint scanning device 119, the certain number being equal to the number that represents how many times the fingerprint scanning device 119 has scanned the fingerprint.

The biometric information is produced in the step S97, and the process proceeds to the step S98. The fingerprint scanning device 119 scans the user's fingerprint multiple times, and the biometric information is produced based on the plurality of output images. In the step S98, the assistance server 200 is requested to register the user, and the process returns to the step S71. Specifically, the registration request command including the biometric information is transmitted to the assistance server 200.

Figure 20:
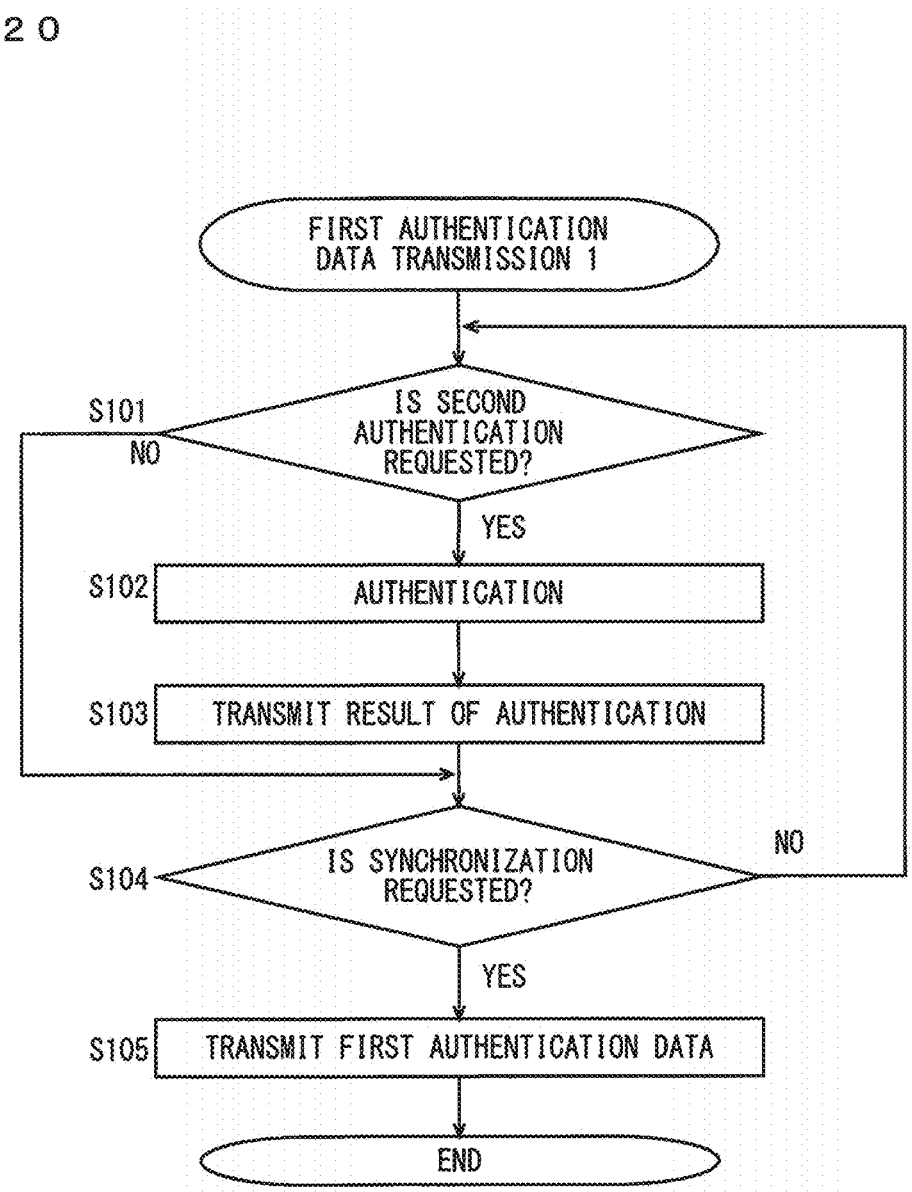
FIG. 20 is a flowchart showing one example of a flow of a first authentication data transmission process.

FIG. 20 is a flowchart showing one example of a flow of a first authentication data transmission process. The first authentication data transmission process is a process executed by the CPU included in the authentication server 300 when the CPU included in the authentication server 300 executes a first authentication data transmission program. Referring to FIG. 20, the CPU included in the authentication server 300 determines whether a second authentication request has been accepted (step S101). Specifically, the CPU determines whether a second authentication request command has been received from any one of the MFPs 100, 100A, 100B. If the second authentication request command is received from any one of the MFPs 100, 100A, 100B, the process proceeds to the step S102. If not, the process proceeds to the step S104. An authentication process is executed in the step S102, and the process proceeds to the step S103. Specifically, if the first authentication record including the user ID and the first authentication information that are the same as the user ID and the first authentication information included in the second authentication request command is present in the first authentication data, the CPU authenticates the user. If not, the CPU does not authenticate the user. In the step S103, a result of authentication is returned, and the process proceeds to the step S104. Specifically, the CPU transmits the result of authentication to the device that has transmitted the second authentication request command among the MFPs 100, 100A, 100B.

In the step S104, the CPU determines whether the assistance server 200 has requested synchronization. If the assistance server 200 has requested synchronization, the process proceeds to the step S105. If not, the process returns to the step S101. In the step S105, the first authentication data is transmitted to the assistance server 200, and the process returns to the step S101.

First Modified Example

In a first modified example, a plurality of first authentication records included in the first authentication data stored by the authentication server 300 are associated with update date and time in addition to a user ID and first authentication information. The update of the first authentication record includes addition of a new first authentication record, deletion of a first authentication record and a change of a first authentication record.

Figure 21:
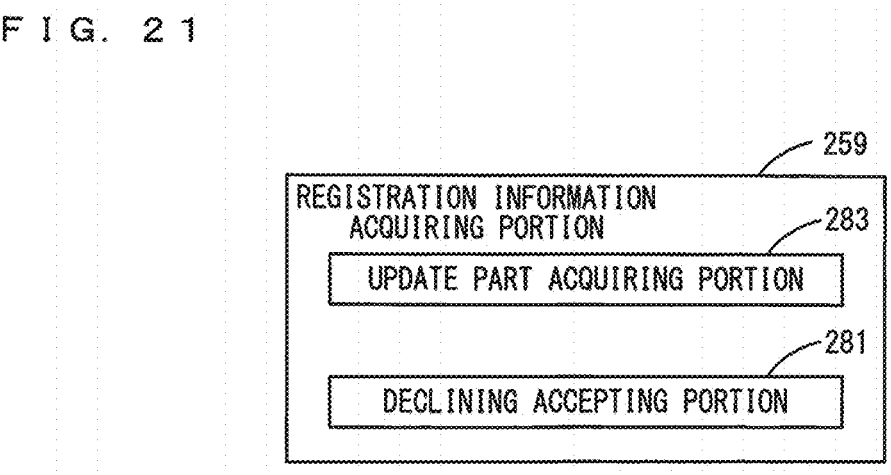
FIG. 21 is a block diagram showing one example of the detailed functions of a registration information acquiring portion in a first modified example.

FIG. 21 is a block diagram showing one example of the detailed functions of a registration information acquiring portion in the first modified example. Referring to FIG. 21, the registration information acquiring portion 259 of a CPU 201 included in an assistance server 200 in the modified example is different from the registration information acquiring portion 259 shown in FIG. 8 in that an update part acquiring portion 283 is added. The other functions are the same as the functions shown in FIG. 8. Therefore, a description thereof will not be repeated.

The update part acquiring portion 283 acquires the first authentication record that is updated later than the last update date and time from the authentication server 300. The update part acquiring portion 283 transmits an update synchronization command including the update date and time when the first authentication record is last acquired to the authentication server 300. When receiving the update synchronization command, the authentication server 300 transmits the first authentication record including the update date and time that are later than the update date and time included in the update synchronization command among the plurality of first authentication records included in the first authentication data to the assistance server 200. In response, the update part acquiring portion 283 receives the first authentication record transmitted from the authentication server 300 and outputs the first authentication record to the producing portion 261.

Figure 22:
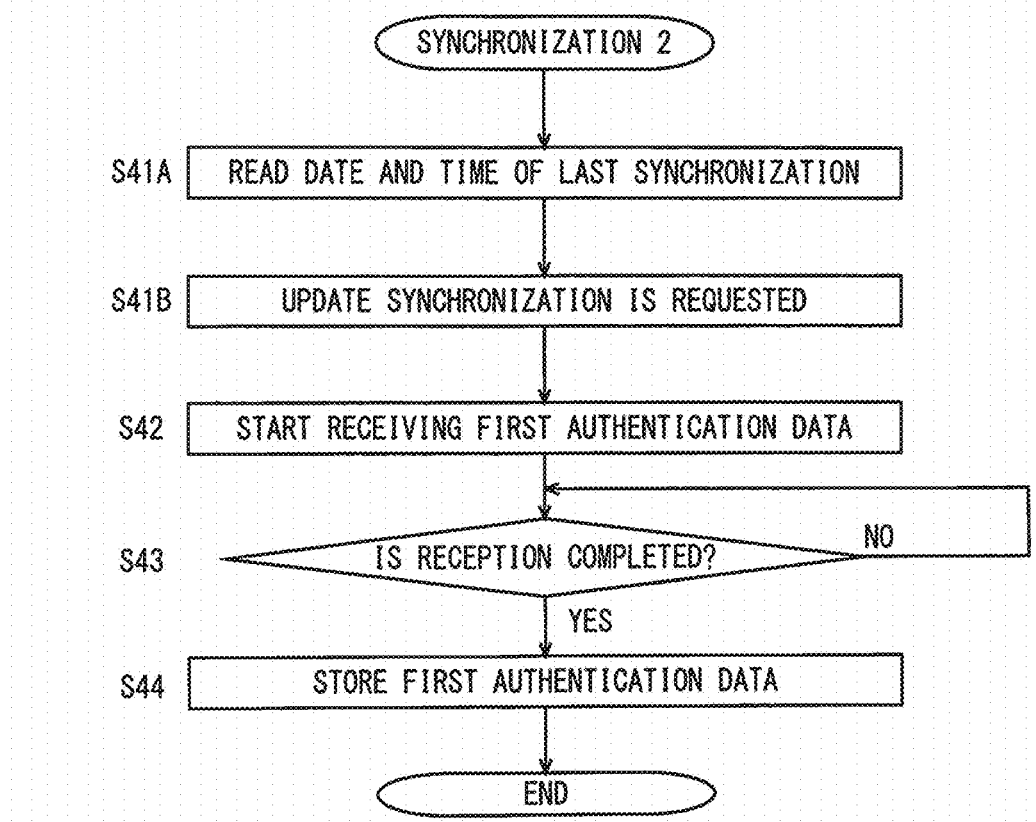
FIG. 22 is a flowchart showing one example of a flow of a synchronization process in the first modified example.

FIG. 22 is a flowchart showing one example of a flow of a synchronization process in the first modified example. Referring to FIG. 22, the synchronization process in the first modified example is different from the synchronization process shown in FIG. 14 in that the step S41 is changed to the step S41A and the step S41B. The other process is the same as the process shown in FIG. 15. Therefore, a description thereof will not be repeated. The date and time of last synchronization are read in the step S41A, and the process proceeds to the step S41B. In the step S41B, the authentication server 300 is requested to perform update synchronization Specifically, an update synchronization command including the date and time of the last update that are read in the step S41A is transmitted.

Figure 23:
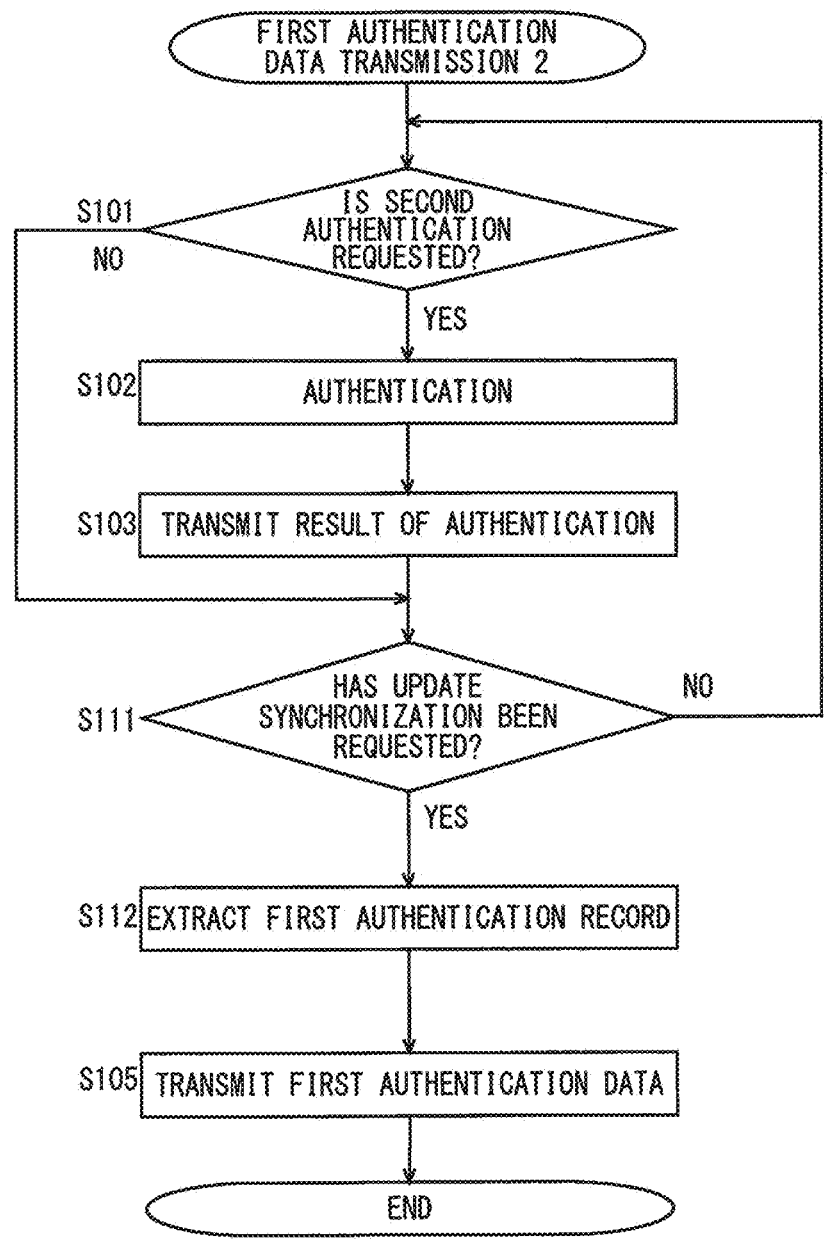
FIG. 23 is a flowchart showing one example of a flow of a first authentication data transmission process in the first modified example.

FIG. 23 is a flowchart showing one example of a flow of a first authentication data transmission process in the first modified example. Referring to FIG. 23, the first authentication data transmission process in the first modified example is different from the first authentication data transmission process shown in FIG. 20 in that the step S104 is changed to the step S111 and the step S112. The other process is the same as the process shown in FIG. 20. Therefore, a description thereof will not be repeated. In the step S111, the CPU determines whether the assistance server 200 has requested synchronization. When an update synchronization command is received from the assistance server 200, the CPU determines that update synchronization has been requested. If update synchronization is requested, the process proceeds to the step S112. If not, the process returns to the step S101. The first authentication record that is updated later than the update date and time included in the update synchronization command among the plurality of first authentication records included in the first authentication data is extracted in the step S112, and the process proceeds to the step S105.

Second Modified Example

In a second modified example, in addition to a user ID and first authentication information, the plurality of first authentication records included in the first authentication data stored in the authentication server 300 are associated with department identification information for identifying the department to which a user belongs.

Figure 24:
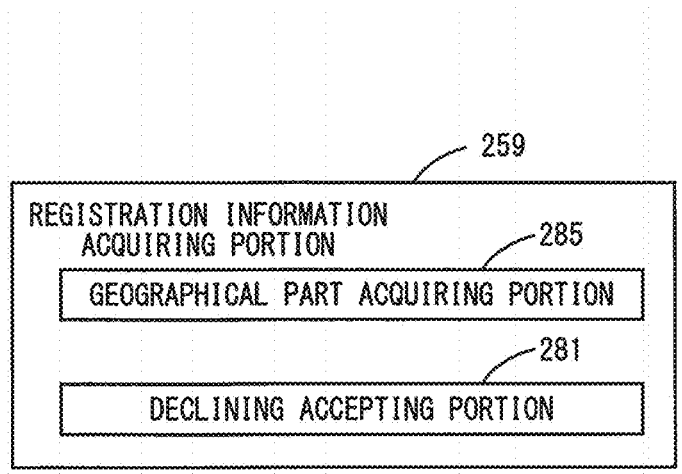
FIG. 24 is a block diagram showing one example of the detailed functions of a registration information acquiring portion in a second modified example.

FIG. 24 is a block diagram showing one example of the detailed functions of a registration information acquiring portion in the second modified example. Referring to FIG. 24, the registration information acquiring portion 259 of the CPU 201 included in the assistance server 200 in the second modified example is different from the registration information acquiring portion 259 shown in FIG. 8 in that a geographical part acquiring portion 285 is added. The other functions are the same as the functions shown in FIG. 8. Therefore, a description thereof will not be repeated.

The geographical part acquiring portion 285 acquires the first authentication record of the user who belongs to the department including the position in which the MFP 100 is placed. The assistance server 200 stores a department position table that associates the department with the position information representing where the department is located. The geographical part acquiring portion 285 specifies the department based on the position at which the MFP 100 is placed and the department position table, and specifies the department identification information for identifying the department. The geographical part acquiring portion 285 transmits a geographical synchronization command including the department identification information to the authentication server 300. The authentication server 300 transmits the first authentication record including the department identification information included in the geographical synchronization command to the assistance server 200. In response, the geographical part acquiring portion 285 receives the first authentication record transmitted from the authentication server 300, and outputs the first authentication record to the producing portion 261.

Figure 25:
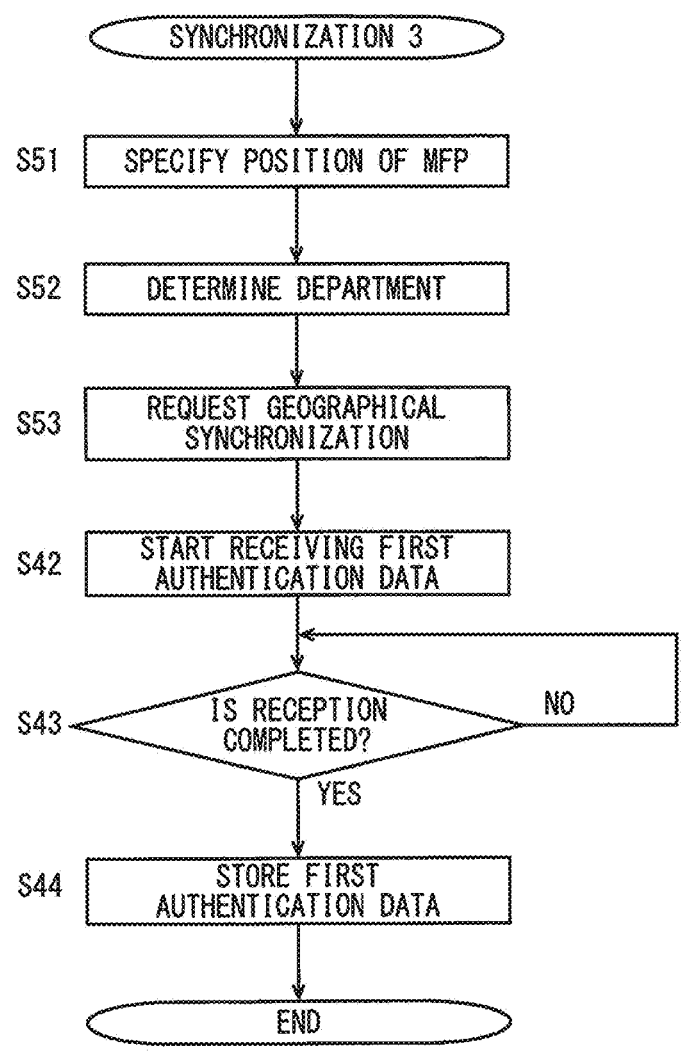
FIG. 25 is a flowchart showing one example of a flow of a synchronization process in the second modified example.

FIG. 25 is a flowchart showing one example of a flow of a synchronization process in the second modified example. Referring to FIG. 25, the synchronization process in the second modified example is different from the synchronization process shown in FIG. 14 in that the step S41 is changed to the steps S51 to S53. The other process is the same as the process shown in FIG. 14. Therefore, a description thereof will not be repeated. In the step S51, the position of the MFP 100 that has transmitted a first authentication request command is specified. In the next step S52, the department in which the MFP 100 is placed is determined. Then, a geographical synchronization command is transmitted to the authentication server 300. The geographical synchronization command includes the department identification information for identifying the department determined in the step S52.

Figure 26:
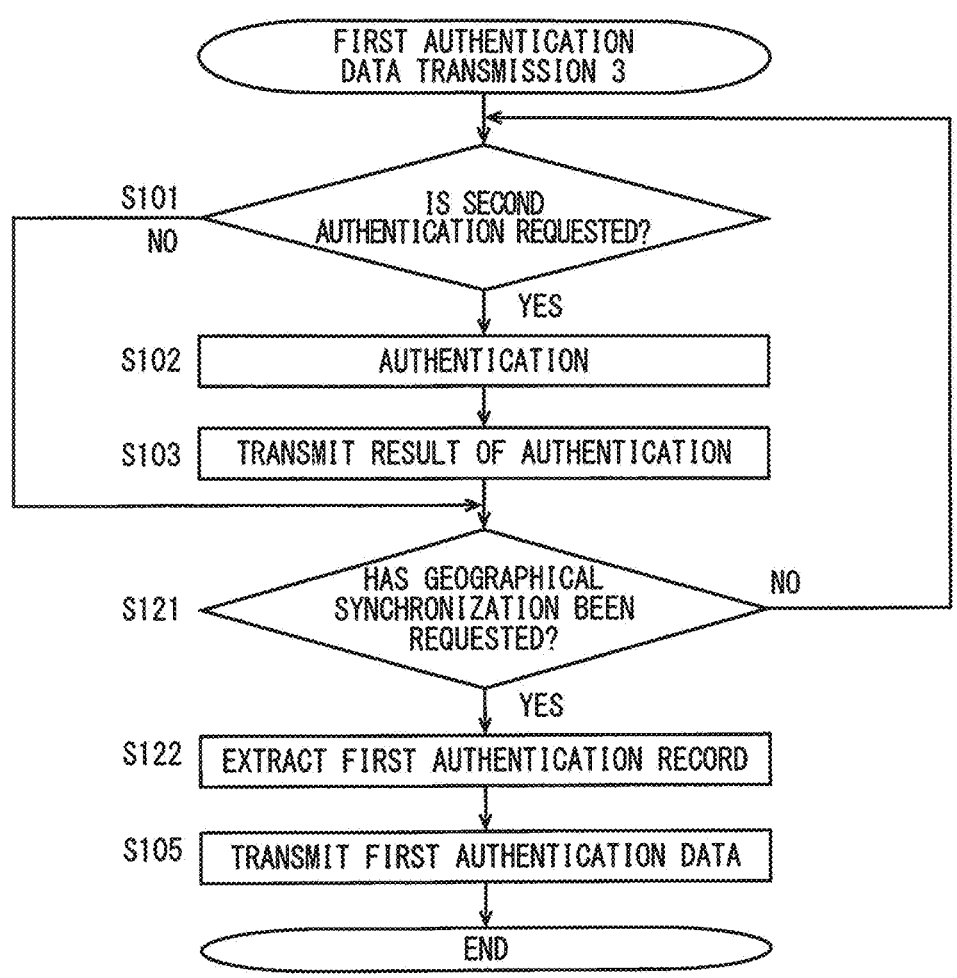
FIG. 26 is a flowchart showing one example of a flow of a first authentication data transmission process in the second modified example.

FIG. 26 is a flowchart showing one example of a flow of a first authentication transmission process in the second modified example. Referring to FIG. 26, the first authentication data transmission process in the second modified example is different from the first authentication data transmission process shown in FIG. 20 in that the step S104 is changed to the steps S121 and S122. The other process is the same as the process shown in FIG. 20. Therefore, a description thereof will not be repeated. In the step S121, the CPU determines whether the assistance server has requested geographical synchronization. Specifically, the CPU determines whether a geographical synchronization command has been received. If the geographical synchronization command is received, the process proceeds to the step S122. If not, the process returns to the step S101. In the step S122, the first authentication record including the department identification information included in the geographical synchronization command among the plurality of first authentication records included in the first authentication data is extracted, and the process proceeds to the step S105.

Third Modified Example

FIG. 27 is a block diagram showing one example of the detailed functions of a registration information acquiring portion in a third modified example. Referring to FIG. 27, the registration information acquiring portion 259 of the CPU 201 included in the assistance server 200 in the third modified example is different from the registration information acquiring portion 259 shown in FIG. 8 in that an acquisition time estimating portion 287 and an individual acquiring portion 289 are added. The other functions are the same as the functions shown in FIG. 8. Therefore, a description thereof will not be repeated.

The acquisition time estimating portion 287 estimates the period of time required to acquire first authentication data from the authentication server 300. The acquisition time estimating portion 287 acquires an amount of data of the first authentication data and estimates an acquisition period of time based on the amount of data and the communication speed before acquisition of the first authentication data from the authentication server 300. The communication speed indicates the amount of data to be received per unit time. The acquisition time estimating portion 287 outputs the acquisition period of time to the individual acquiring portion 289.

The individual acquiring portion 289 causes the MFP 100 to transmit a user ID in the case where the acquisition period of time is equal to or smaller than a threshold value. For example, when receiving a registration instruction command from the assistance server 200, the MFP 100 accepts a user ID and produces biometric information. However, the MFP 100 accepts the user ID before producing the biometric information and transmits the user ID to the assistance server 200 before producing the biometric information. In response to receiving the user ID from the MFP 100, the individual acquiring portion 289 transmits an individual synchronization command including the user ID to the authentication server 300. The authentication server 300 transmits the first authentication record including the user ID included in the individual synchronization command to the assistance server 200. In response, the individual acquiring portion 289 receives the first authentication record and outputs the first authentication record to the producing portion 261.

Figure 28:
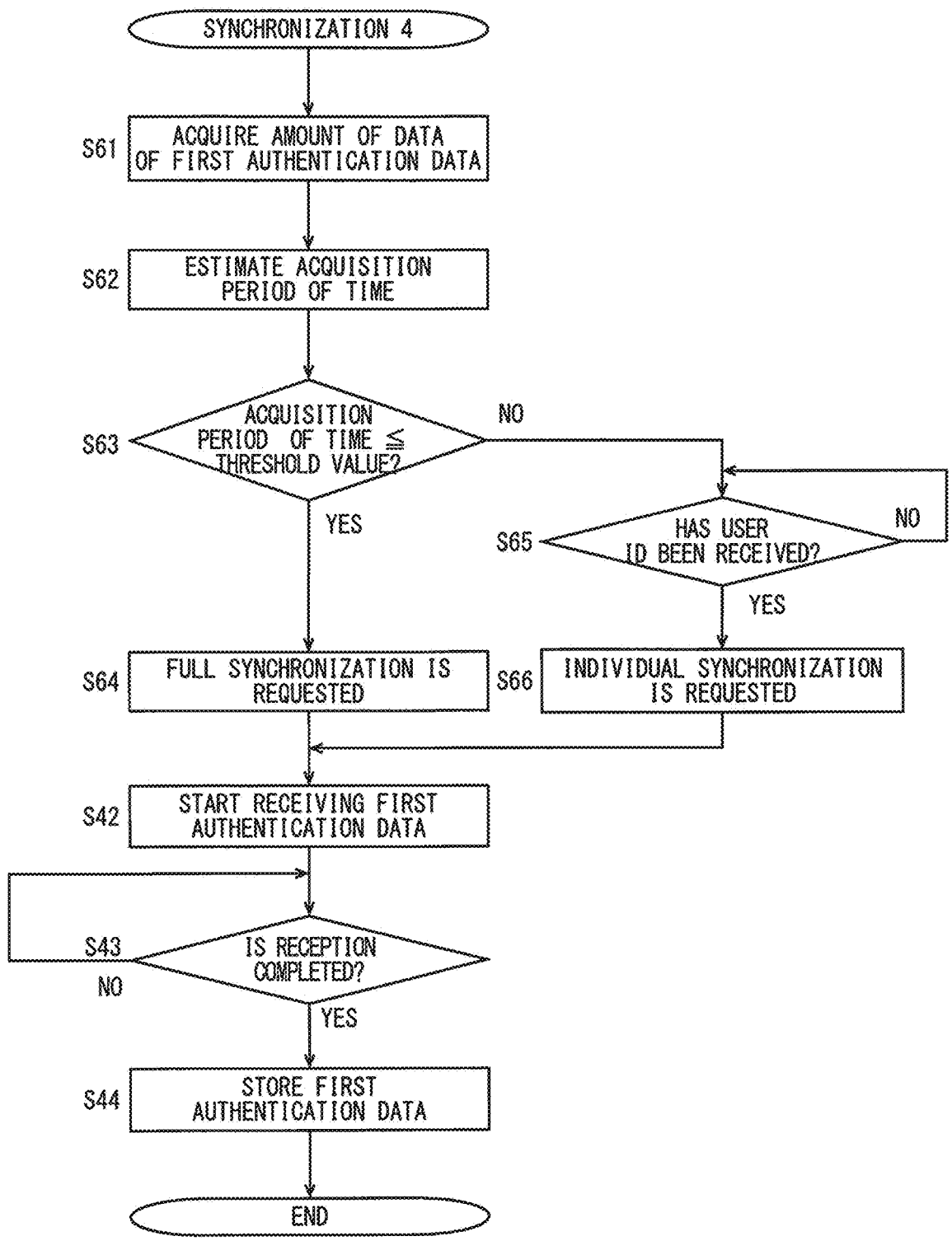
FIG. 28 is a flowchart showing one example of a flow of a synchronization process in the third modified example.

FIG. 28 is a flowchart showing one example of a flow of a synchronization process in the third modified example. Referring to FIG. 28, the synchronization process in the third modified example is different from the synchronization process shown in FIG. 14 in that the step S41 is changed to the steps S61 to S66. The other process is the same as the process shown in FIG. 14. Therefore, a description thereof will not be repeated. In the step S61, an amount of data of first authentication data is acquired from the authentication server 300, and the process proceeds to the step S62. In the step S62, the acquisition period of time is estimated. The time calculated based on the amount of data and the communication speed is estimated as the acquisition period of time. In the next step S63, the CPU 201 determines whether the acquisition period of time is equal to or smaller than a threshold value. If the acquisition period of time is equal to or smaller than the threshold value, the process proceeds to the step S64. If not, the process proceeds to the step S65. In the step S64, the authentication server 300 is requested to perform full synchronization, and the process proceeds to the step S42. The request of full synchronization is a request for transmission of all of the first authentication data stored in the authentication server 300.

In the step S65, the CPU 201 determines whether a user ID has been received from the MFP 100. If the user ID is not received from the MFP 100, the process waits until the user ID is received (NO in the step S65). If the user ID is received from the MFP 100, the process proceeds to the step S66. In the step S66, the authentication server 300 is requested to perform individual synchronization, and the process proceeds to the step S42. Specifically, an individual synchronization command including the user ID transmitted from the MFP 100 is transmitted to the authentication server 300.

Figure 29:
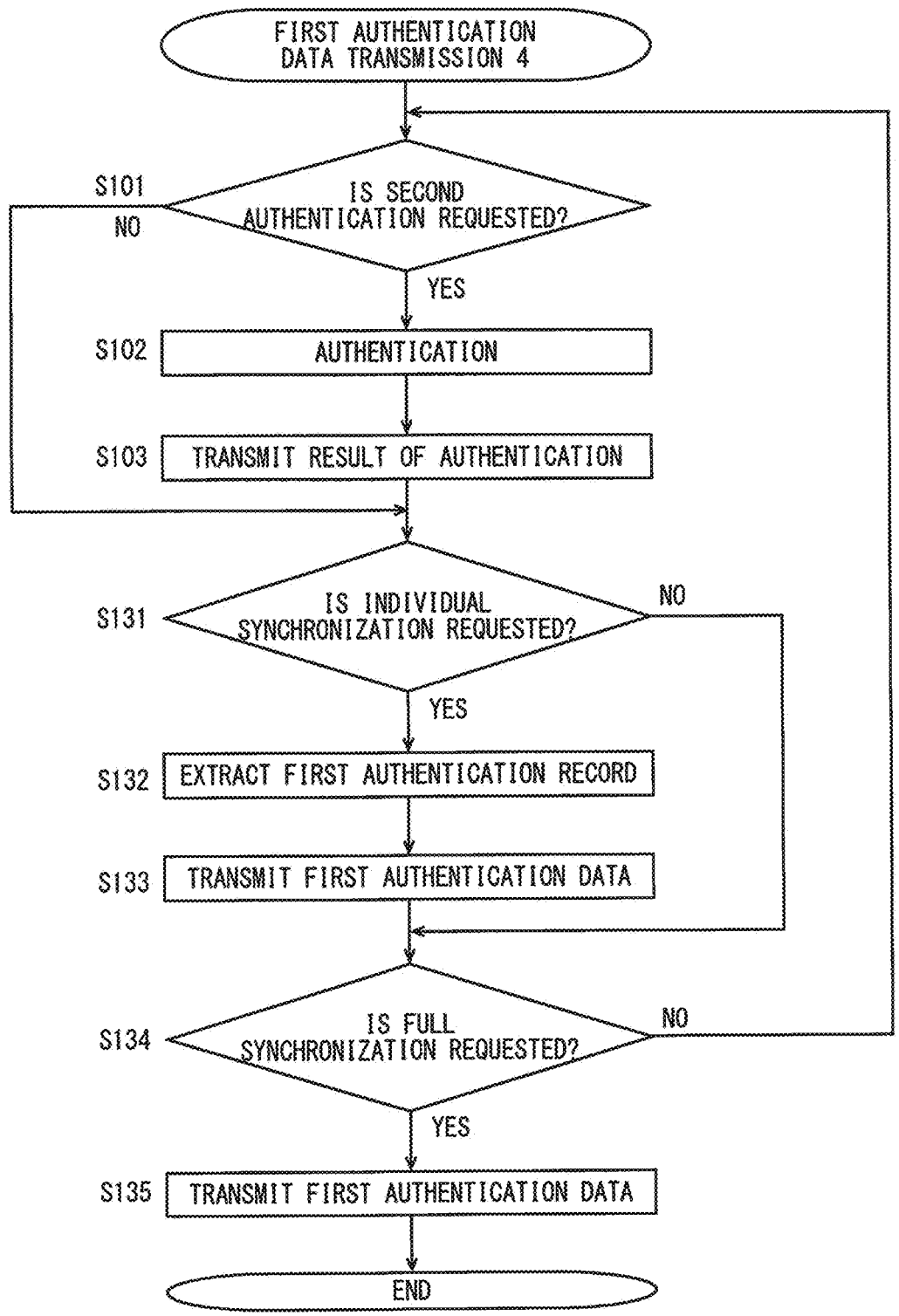
FIG. 29 is a flowchart showing one example of a flow of a first authentication data transmission process in the third modified example.

FIG. 29 is a flowchart showing one example of a flow of a first authentication data transmission process in the third modified example. Referring to FIG. 29, the first authentication data transmission process in the third modified example is different from the first authentication data transmission process shown in FIG. 20 in that the step S104 is changed to the steps S131 to S135. The other process is the same as the process shown in FIG. 20. Therefore, a description thereof will not be repeated. In the step S131, the CPU determines whether individual synchronization has been requested by the assistance server. If individual synchronization has been requested, the process proceeds to the step S132. If not, the process proceeds to the step S134. When an individual synchronization command is received, the CPU determines that individual synchronization has been requested. In the step S132, the first authentication record including the user ID included in the individual synchronization command among the plurality of first authentication records included in the first authentication data is extracted, and the process proceeds to the step S133. The first authentication data including the extracted first authentication record is transmitted to the assistance server 200 in the step S133, and the process proceeds to the step S134.

In the step S134, the CPU determines whether full synchronization has been requested by the assistance server. If full synchronization is requested, the process proceeds to the step S135. If not, the process returns to the step S101. In the step S135, all of the first authentication data is transmitted to the assistance server 200, and the process ends.

Fourth Modified Example

Either one of the update part acquiring portion 283 in the first modified example and the geographical part acquiring portion 285 in the second modified example may function, or both of the update part acquiring portion 283 in the first modified example and the geographical part acquiring portion 285 in the second modified example may function at the same time. In the case where both of them function at the same time, the first authentication data is associated with update data and time and position information in addition to a user ID and first authentication information. In this case, the authentication server 300 transmits the first authentication record, which includes the geographical information including the position represented by the position information included in the first authentication data and is updated later than the update data and time, to the assistance server 200.

Further, two or more of the first to fourth modified examples may be combined as desired.

Fifth Modified Example

Although transmitting a user ID and a password to the MFP 100 when the assistance server 200 is requested by the MFP 100 to perform second authentication, the assistance server 200 may request the authentication server 300 to perform second authentication instead of the MFP 100. For example, the assistance server 200 requests the authentication server 300 to perform authentication of a user using a user ID and first authentication information instead of the MFP 100. Specifically, the assistance server 200 transmits the second authentication request command including the user ID and the first authentication information to the authentication server 300 instead of the MFP 100. In the case where being requested by the assistance server 200 to perform authentication, the authentication server 300 determines that the MFP 100 has requested authentication. When receiving the second authentication request command, the authentication server 300 performs authentication with reference to the first authentication data. Specifically, if the first authentication record including the user ID and the password that are the same as the user ID and the password included in the second authentication request command is present, the authentication server 300 authenticates the user. If not, the authentication server 300 does not authenticate the user. Then, the authentication server 300 transmits a result of authentication to the MFP 100.

As described above, the assistance server 200 in the present embodiment assists authentication of the user who operates the MFP 100 by the authentication server 300. In response to being requested to perform authentication of the user, the authentication server 300 performs authentication of the user using the first authentication data that associates the user ID for identifying a registered user with the first authentication information. In response to detection of no registration of second authentication information of the user, the assistance server 200 acquires the first authentication data from the authentication server 300 and produces the second authentication data that associates the second authentication information with the first authentication data. Therefore, because the first authentication information can be specified from the second authentication data, the authentication server 300 can perform authentication. As a result, authentication can be performed with use of second authentication information such as biometric information while authentication is performed by the authentication server 300 with use of first authentication information.

Further, in response to detection of no registration of second authentication information of the user, the assistance server 200 instructs the MFP 100 to register second authentication information of the user. Therefore, the MFP 100 is not instructed to register in the case where second authentication information is registered. Thus, an unnecessary process can be prevented from being executed, and the process can be simplified.

Further, the second authentication information is the biometric information that is produced by the MFP 100 that scans a biometric feature of a user multiple times, and the assistance server 200 receives a registration request including the user ID and the biometric information of the user who operates the MFP 100. Therefore, the assistance server 200 can acquire the first authentication data from the authentication server 300 by the time the MFP 100 scans the biometric feature of the user multiple times and produces the biometric information. Therefore, the waiting time of the user can be reduced as much as possible.

Further, in response to being requested by the MFP 100 to register, the assistance server 200 associates the second authentication information included in the registration request with the user identification information included in the registration request. Thus, the second authentication information input in the MFP 100 by the user is reliably associated with the first authentication information of the user.

Further, the biometric feature is one of a fingerprint, a vein, an iris, a retina, a shape of palm, a facial feature, a physique and a voiceprint.

Further, after acquisition of the first authentication data from the authentication server 300 is completed, the assistance server 200 produces the second authentication data. Therefore, the second authentication information input by the user can be reliably associated with the first authentication information of the user.

Further, in the case where registration is not permitted by the user who operates the MFP 100 after an instruction for registering the second authentication information is provided by the MFP 100, the assistance server 200 does not acquire the first authentication data. Therefore, the second authentication information of the user whose registration is unnecessary can be prevented from being registered.

Further, the assistance server 200 updates the second authentication data with the first authentication data. Therefore, the change in the first authentication data in the authentication server 300 can be reflected in the second authentication data.

Further, the assistance server 200 deletes the second authentication data including the user identification information that does not match with any of the user identification information in the first authentication data. Therefore, the change in the first authentication data in the authentication server 300 can be reflected in the second authentication data.

Further, in response to being requested to perform authentication of the user who operates the MFP 100, the assistance server 200 compares the biometric feature of the user who operates the MFP 100 with the second authentication information, determines the first authentication data corresponding to the user who operates the MFP 100 and notifies the MFP 100 of the first authentication data. Therefore, the MFP 100 can request the authentication server 300 to perform authentication of the user who operates the MFP 100 with the first authentication data.

Further, the assistance server 200 in the first modified example acquires only the first authentication data that has been updated later than the time when the first authentication data is last acquired. Therefore, an amount of data of the first authentication data received from the authentication server 300 is reduced, so that the first authentication information can be acquired from the authentication server 300 as quickly as possible. As a result, the waiting time of the user who operates the MFP 100 can be reduced as much as possible.

Further, the assistance server 200 in the second modified example acquires only the first authentication data associated with the geographical information representing the geographical position being within a predetermined range from the position at which the MFP 100 is located. Therefore, the amount of data of the first authentication data received from the authentication server 300 is reduced, so that the first authentication information can be acquired from the authentication server 300 as quickly as possible. As a result, the waiting time of the user who operates an information processing apparatus can be reduced as much as possible.

Further, the assistance server 200 in the third modified example estimates an acquisition period of time required for acquisition of the first authentication data from the authentication server 300, requests the MFP 100 to transmit the user identification information of the user in the case where the acquisition period of time is equal to or larger than the threshold value, acquires the user identification information and acquires only the first authentication data including the acquired user identification information from the authentication server 300. Therefore, the amount of data of the first authentication data received from the authentication server 300 is reduced, so that the first authentication information can be acquired from the authentication server 300 as quickly as possible. Therefore, the waiting time of the user who operates the MFP 100 can be reduced as much as possible.

Further, in response to a request of authentication of the user who operates the MFP 100, the assistance server 200 in the fifth modified example compares the biometric feature of the user who operates the MFP 100 with the second authentication information, determines the first authentication data corresponding to the user who operates the MFP 100 and requests the authentication server 300 to perform authentication of the user who operates the MFP 100 using the first authentication data instead of the MFP 100. Therefore, the assistance server 200 can request the authentication server 300 to perform authentication of the user who operates the MFP 100 using the first authentication data.

Although embodiments of the present invention have been described and illustrated in detail, the disclosed embodiments are made for purpose of illustration and example only and not limitation. The scope of the present invention should be interpreted by terms of the appended claims

What is claimed is:

1. An authentication system comprising:
   an information processing apparatus, an authentication server for authenticating a user using first authentication data, and an assistance server for generating second authentication data,
   the authentication server, in response to being requested to perform authentication of the user, performing authentication of the user using first authentication data that associates user identification information for identifying a registered user with first authentication information, and
   a non-transitory computer-readable recording medium encoded with an assistance program to control the assistance server as follows:
   when the assistance server receives from a user second authentication information that is not registered with the assistance server, the assistance server acquires the first authentication data for the user from the authentication server, and
   produces second authentication data that associates the second authentication information with the first authentication data.

2. The authentication system according to claim 1, wherein
   the information processing apparatus is an image forming apparatus that includes a function of forming an image.

3. An assistance server that assists authentication by an authentication server of a user who operates an information processing apparatus,
   the authentication server, in response to being requested to perform authentication of the user, performing authentication of the user using first authentication data that associates user identification information for identifying a registered user with first authentication information, and
   the assistance server comprising a hardware processor, wherein
   the hardware processor is configured to:
   when the assistance server receives from a user second authentication information that is not registered with the assistance server, acquire the first authentication data for the user from the authentication server, and
   produce second authentication data that associates the second authentication information with the first authentication data.

4. The assistance server according to claim 3, wherein
   the hardware processor, in response to detection of no registration of the second authentication information of the user, is configured to instruct the information processing apparatus to register the second authentication information of the user.

5. The assistance server according to claim 3, wherein
   the second authentication information is biometric information that is produced by the information processing apparatus that has scanned a biometric feature of the user who operates the information processing apparatus multiple times, and
   the hardware processor is configured to receive a registration request including the user identification information and the biometric information of the user who operates the information processing apparatus from the information processing apparatus.

6. The assistance server according to claim 5, wherein the hardware processor, in response to receiving the registration request from the information processing apparatus, is configured to associate the second authentication information included in the registration request with the first authentication data including the user identification information included in the registration request.

7. The assistance server according to claim 6, wherein the biometric feature is any one of a fingerprint, a vein, an iris, a retina, a shape of palm, a facial feature, a physique and a voiceprint.

8. The assistance server according to claim 3, wherein the hardware processor is configured to produce the second authentication data after acquisition of the first authentication data from the authentication server is completed.

9. The assistance server according to claim 3, wherein the hardware processor is configured to:
estimate an acquisition period of time required to acquire the first authentication data from the authentication server, and
in the case where the acquisition period of time is equal to or larger than a threshold value, request the information processing apparatus to transmit the user identification information of the user who operates the information processing apparatus and perform individual synchronization and to not perform full synchronization.

10. The assistance server according to claim 3, wherein the hardware processor, in the case where registration is not permitted by the user who operates the information processing apparatus after the information processing apparatus is instructed to register the second authentication information, is configured not to acquire the first authentication data.

11. The assistance server according to claim 3, wherein the hardware processor is configured to acquire only the first authentication data that is updated later than a time when the first authentication data is last acquired.

12. The assistance server according to claim 3, wherein the first authentication data is further associated with geographical information representing a geographical region to which a registered user belongs, and
the hardware processor is configured to acquire only the first authentication data associated with the geographical information representing a geographical position being within a predetermined range from the information processing apparatus.

13. The assistance server according to claim 3, wherein the first authentication information is a password.

14. The assistance server according to claim 3, wherein the hardware processor is further configured to update the second authentication data with the acquired first authentication data.

15. The assistance server according to claim 3, wherein the hardware processor is further configured to delete the second authentication data that includes the user identification information that does not match any one of the user identification information of the acquired first authentication data.

16. The assistance server according to claim 3, wherein the hardware processor is further configured to:
in response to being requested to perform authentication of the user who operates the information processing apparatus, compare a biometric feature of the user who operates the information processing apparatus to the second authentication information, and determine the first authentication data corresponding to the user who operates the information processing apparatus, and
notify the information processing apparatus of the determined first authentication data.

17. The assistance server according to claim 3, wherein the hardware processor is further configured to:
in response to being requested to perform authentication of the user who operates the information processing apparatus, compare a biometric feature of the user who operates the information processing apparatus with the second authentication information, and determine the first authentication data corresponding to the user who operates the information processing apparatus, and
request the authentication server to perform authentication of the user who operates the information processing apparatus using the determined first authentication data instead of the information processing apparatus.

18. A non-transitory computer-readable recording medium encoded with an assistance program executed by a computer controlling an assistance server that assists authentication by an authentication server of a user who operates an information processing apparatus,
the authentication server performing authentication of the user using first authentication data that associates user identification information for identifying a registered user with first authentication information, and
the assistance program causing the computer to:
when the assistance server receives from a user second authentication information that is not registered with the assistance server, acquire the first authentication data for the user from the authentication server, and
produce second authentication data that associates the second authentication information with the first authentication data.

* * * * *